(12) United States Patent
Estrella et al.

(10) Patent No.: US 12,488,452 B2
(45) Date of Patent: Dec. 2, 2025

(54) WAFER BATH IMAGING

(71) Applicant: Tokyo Electron Limited, Tokyo (JP)

(72) Inventors: Joel Estrella, Austin, TX (US); Ihsan Simms, Austin, TX (US); Michael Carcasi, Austin, TX (US); Joshua Hooge, Austin, TX (US); Hiroshi Marumoto, Koshi (JP)

(73) Assignee: Tokyo Electron Limited, Tokyo (JP)

( * ) Notice: Subject to any disclaimer, the term of this patent is extended or adjusted under 35 U.S.C. 154(b) by 464 days.

(21) Appl. No.: 17/349,538

(22) Filed: Jun. 16, 2021

(65) Prior Publication Data
US 2022/0405902 A1 Dec. 22, 2022

(51) Int. Cl.
*G06T 7/00* (2017.01)
*B08B 3/08* (2006.01)
(Continued)

(52) U.S. Cl.
CPC .............. *G06T 7/001* (2013.01); *B08B 3/08* (2013.01); *B08B 3/106* (2013.01); *B08B 13/00* (2013.01); *G06T 7/11* (2017.01); *G06T 7/50* (2017.01); *G06V 10/22* (2022.01); *G06V 10/60* (2022.01); *G06V 20/46* (2022.01); *G10L 25/51* (2013.01);
(Continued)

(58) Field of Classification Search
CPC .. G06T 7/00; G06T 7/001; G06T 7/10; G06T 7/11; G06T 7/50; G06T 7/40; G06T 7/44; G06T 2207/10016; G06T 2207/20; G06T 2207/20021; G06T 2207/30108; G06T 2207/30148; G06T 2207/30242; G06V 20/46; G06V 20/47; G06V 20/49; G06V 10/00; G06V 10/50; G06V 10/60; G06V 10/20; G06V 10/22; B08B 3/08; B08B 3/106; B08B 13/00; B08B 2203/007; G10L 25/51; G10L 25/57; G10L 25/60; H01L 21/67057; H01L 21/67253
See application file for complete search history.

(56) References Cited

U.S. PATENT DOCUMENTS 4,647,172 A  3/1987 Batchelder et al.
4,851,311 A  7/1989 Millis et al.
(Continued)

FOREIGN PATENT DOCUMENTS

JP  H04262552 A  9/1992
JP  H09276775 A  10/1997
(Continued)

OTHER PUBLICATIONS

FLIR Systems Lepton series LWIR camera specification sheet Mar. 2021, 2 pages.
(Continued)

*Primary Examiner* — Oneal R Mistry
*Assistant Examiner* — Duy Tran
(74) *Attorney, Agent, or Firm* — Slater Matsil LLP

(57) ABSTRACT

An exemplary method of monitoring a bath process includes processing a first wafer by submerging the first wafer within a bath solution; capturing a video of the bath solution containing the first wafer during a first time interval; analyzing the video based on intensity of light captured in a frame of the video; and based on analyzing the video, determining a first metric of the bath solution during the first time interval.

18 Claims, 19 Drawing Sheets

(51) Int. Cl.
| | |
|---|---|
| *B08B 3/10* | (2006.01) |
| *B08B 13/00* | (2006.01) |
| *G06K 9/00* | (2022.01) |
| *G06K 9/20* | (2006.01) |
| *G06K 9/46* | (2006.01) |
| *G06T 7/11* | (2017.01) |
| *G06T 7/50* | (2017.01) |
| *G06V 10/22* | (2022.01) |
| *G06V 10/60* | (2022.01) |
| *G06V 20/40* | (2022.01) |
| *G10L 25/51* | (2013.01) |
| *H01L 21/67* | (2006.01) |

(52) U.S. Cl.
CPC .. *H01L 21/67057* (2013.01); *H01L 21/67253* (2013.01); *B08B 2203/007* (2013.01); *G06T 2207/10016* (2013.01); *G06T 2207/20021* (2013.01); *G06T 2207/30148* (2013.01); *G06T 2207/30242* (2013.01)

(56) References Cited

U.S. PATENT DOCUMENTS

| | | | |
|---|---|---|---|
| 5,089,305 | A | 2/1992 | Ushijima et al. |
| 5,094,884 | A | 3/1992 | Hillman et al. |
| 5,127,362 | A | 7/1992 | Iwatsu et al. |
| 5,366,757 | A | 11/1994 | Lin |
| 5,939,130 | A | 8/1999 | Shiraishi et al. |
| 5,985,357 | A | 11/1999 | Sanada |
| 6,115,120 | A * | 9/2000 | Moriya ............ G01N 15/0227 356/337 |
| 6,248,175 | B1 | 6/2001 | Subramanian et al. |
| 6,319,317 | B1 | 11/2001 | Takamori |
| 6,376,013 | B1 | 4/2002 | Rangarajan et al. |
| 6,383,948 | B1 | 5/2002 | Kitano et al. |
| 6,493,078 | B1 | 12/2002 | Fitzsimmons |
| 6,642,155 | B1 | 11/2003 | Whitman et al. |
| 6,680,078 | B2 | 1/2004 | Davlin et al. |
| 6,686,602 | B2 | 2/2004 | Some |
| 6,693,708 | B1 | 2/2004 | Hunter |
| 6,707,545 | B1 | 3/2004 | Hunter |
| 6,710,868 | B2 | 3/2004 | Guetta |
| 6,721,045 | B1 | 4/2004 | Hunter |
| 6,818,064 | B2 | 11/2004 | Baker |
| 6,849,563 | B2 | 2/2005 | Barth et al. |
| 6,869,640 | B2 | 3/2005 | Yoshihara et al. |
| 6,870,610 | B1 * | 3/2005 | Struckhoff ......... G01N 21/896 356/237.1 |
| 6,913,781 | B2 | 7/2005 | Kaneyama et al. |
| 6,982,002 | B2 | 1/2006 | Tanaka et al. |
| 7,012,684 | B1 | 3/2006 | Hunter |
| 7,485,188 | B2 | 2/2009 | Takekuma et al. |
| 7,497,026 | B2 | 3/2009 | Herchen |
| 7,659,973 | B2 | 2/2010 | Furman |
| 7,670,643 | B2 | 3/2010 | Winter |
| 9,555,436 | B2 | 1/2017 | Uemae et al. |
| 9,709,510 | B2 | 7/2017 | Kolchin |
| 10,109,508 | B2 | 10/2018 | Ashidate et al. |
| 10,665,481 | B2 | 5/2020 | Sano et al. |
| 2002/0176928 | A1 | 11/2002 | Minami et al. |
| 2004/0046121 | A1 * | 3/2004 | Golden ............... G01J 3/44 356/301 |
| 2004/0072450 | A1 | 4/2004 | Collins et al. |
| 2005/0076935 | A1 * | 4/2005 | Farrar ............... H10D 1/047 257/E21.228 |
| 2005/0263066 | A1 | 12/2005 | Lubomirsky et al. |
| 2006/0262295 | A1 | 11/2006 | Backhauss et al. |
| 2007/0251450 | A1 | 11/2007 | Lin |
| 2008/0144025 | A1 | 6/2008 | Vollrath et al. |
| 2010/0091284 | A1 | 4/2010 | Mieher et al. |
| 2010/0124142 | A1 * | 5/2010 | Laugharn, Jr. ......... B01F 33/30 366/108 |
| 2011/0086442 | A1 * | 4/2011 | Burnham ............... H01L 22/12 257/E21.521 |
| 2013/0010296 | A1 | 1/2013 | Kwak et al. |
| 2013/0100278 | A1 * | 4/2013 | Cormier ............... C25D 11/04 348/92 |
| 2014/0045281 | A1 | 2/2014 | Aiura et al. |
| 2015/0029517 | A1 | 1/2015 | Park et al. |
| 2015/0219499 | A1 | 8/2015 | Waldmann et al. |
| 2015/0346609 | A1 | 12/2015 | Den Boef |
| 2015/0362367 | A1 | 12/2015 | Seo et al. |
| 2016/0293502 | A1 * | 10/2016 | Pirkle ............... H01L 22/12 |
| 2018/0082862 | A1 * | 3/2018 | Ashidate ......... H01L 21/31111 |
| 2018/0323085 | A1 | 11/2018 | Sano et al. |
| 2019/0172737 | A1 | 6/2019 | Endo et al. |
| 2019/0217325 | A1 | 7/2019 | deVilliers |
| 2019/0217326 | A1 | 7/2019 | deVilliers |
| 2019/0287793 | A1 | 9/2019 | deVilliers et al. |
| 2020/0234428 | A1 | 7/2020 | George et al. |
| 2021/0129166 | A1 | 5/2021 | Carcasi et al. |
| 2021/0150697 | A1 | 5/2021 | Estrella et al. |

FOREIGN PATENT DOCUMENTS

| | | |
|---|---|---|
| JP | 2000082646 A | 3/2000 |
| JP | 2004146489 A | 5/2004 |
| JP | 2006049630 A | 2/2006 |
| JP | 2006339598 A | 12/2006 |
| JP | 2009032829 A | 2/2009 |
| JP | 2009094208 A | 4/2009 |
| JP | 2013110270 A | 6/2013 |
| JP | 5431172 B2 | 3/2014 |
| JP | 6000743 B2 | 10/2016 |
| JP | 2017090232 A | 5/2017 |
| JP | 2018046262 A | 3/2018 |
| JP | 2019102742 A | 6/2019 |
| KR | 200287420 Y1 | 8/2002 |
| KR | 100642381 B1 | 11/2006 |
| KR | 100989857 B1 | 10/2010 |
| KR | 101107507 B1 | 1/2012 |
| KR | 20160112240 A | 9/2016 |
| KR | 101842119 B1 | 3/2018 |
| KR | 101977771 B1 | 5/2019 |
| WO | 229390 W | 4/2002 |

OTHER PUBLICATIONS

FLIR, Technical Note, "R&D and industrial applications for Near Infrared (NIR) cameras," Publicly Available at least as of Apr. 1, 2021, 4 pages.

M. Barth, S. Parthasarathy, Jing Wang, E. Hu, S. Hackwood and G. Beni, "A color vision system for microelectronics: Application to oxide thickness measurements," Proceedings. 1986 IEEE International Conference on Robotics and Automation, San Francisco, CA, USA, 1986, pp. 1242-1247.

International Searching Authority, Notification of Transmittal of The International Search Report and the Written Opinion of the International Searching Authority, or the Declaration, International Application No. PCT/US2022/028276, mailed date Aug. 29, 2022, 10 pages.

* cited by examiner

WAFER BATH IMAGING

TECHNICAL FIELD

The present invention relates generally to wafer baths, and in particular to wafer bath imaging.

BACKGROUND

Wafer bath chambers with circulating fluids are commonly used in semiconductor manufacturing to perform substrate surface preparation steps such as surface cleaning, resist strip, and the etching of thin films simultaneously on batches of multiple wafers.

Across wafer and wafer-to-wafer uniformity are critical for providing integrated circuit components such as transistors, capacitors, and resistors with a narrow electrical distribution across all wafers in a lot. Achieving across wafer and wafer-to-wafer uniformity in bath chambers is a challenge for large diameter wafers such as 12-inch wafers. It is therefore important to further develop the technologies of bath chamber systems and methods of wafer processing in bath chamber systems with improved process control.

SUMMARY

In accordance with an embodiment of the present invention, a method of monitoring a bath process includes processing a first wafer by submerging the first wafer within a bath solution; capturing a video of the bath solution containing the first wafer during a first time interval; analyzing the video based on intensity of light captured in a frame of the video; and based on analyzing the video, determining a first metric of the bath solution during the first time interval.

In accordance with an embodiment of the present invention, a method of detecting wafer bridging includes submerging a plurality of wafers within a bath solution; illuminating a side of the plurality of wafers with a light source; capturing a first image of a first portion of the side of the plurality of wafers; and determining wafer bridging occurred between any one of the plurality of wafers based on the first image.

BRIEF DESCRIPTION OF THE DRAWINGS

For a more complete understanding of the present invention, and the advantages thereof, reference is now made to the following descriptions taken in conjunction with the accompanying drawings, in which:

FIG. 3A illustrates analyzing the intensity of light captured by a frame, and FIG. 3B illustrates determining the first metric based on the analysis of frames of the video;

FIG. 5A illustrates analyzing the intensity of light captured by a frame, and FIG. 5B illustrates determining the first metric based on the analysis of frames of the video;

FIG. 12A illustrates a top view of a bath chamber after a plurality of wafers are submerged in a bath solution, FIG. 12B illustrates a top view of the bath chamber after wafer bridging occurs, FIG. 12C illustrates the process steps of determine a first analyzing of the intensity of light captured by a frame of a video, and FIG. 12D illustrates an example data of the analysis.

DETAILED DESCRIPTION OF ILLUSTRATIVE EMBODIMENTS

Differences in the operation of wafer baths can have an effect on how the wafers are processed. For example, changes in the bath process such as changes in the flow of process liquids/gases into a bath chamber or changes in turbulence may result in defects in the processing of wafers. Therefore, monitoring the wafer baths is important so these changes that may occur during processing may be detected.

Embodiments of this disclosure disclose monitoring a bath process by analyzing frames of a video recording (or time lapse imaging) of a bath solution while processing wafers. The bath solution may be video recorded from a variety of points of view such as above the bath, below the bath, to the side of the bath, or from some other angle of interest. In various embodiments, a bath process may be monitored by determining a metric of a bath solution based on a frame by frame analysis of a video recording of the bath solution. In various embodiments, the metric may be used to quantify the bath solution to detect changes or non-uniformities of the bath solution during or after processing wafers.

The techniques described herein may be utilized within a wide variety of processing tools that utilize a wafer bath. For example, exemplary processing tools may be utilized for various processing steps such as cleaning, etching, or the like. It is recognized that the processing tool shown herein is merely an example in which the monitoring techniques may apply. Thus the techniques disclosed herein may apply to other wafer bath systems and/or other processing tools. Moreover, these wafer bath systems may be stand-alone tools or integrated into a larger system.

Figure 1:
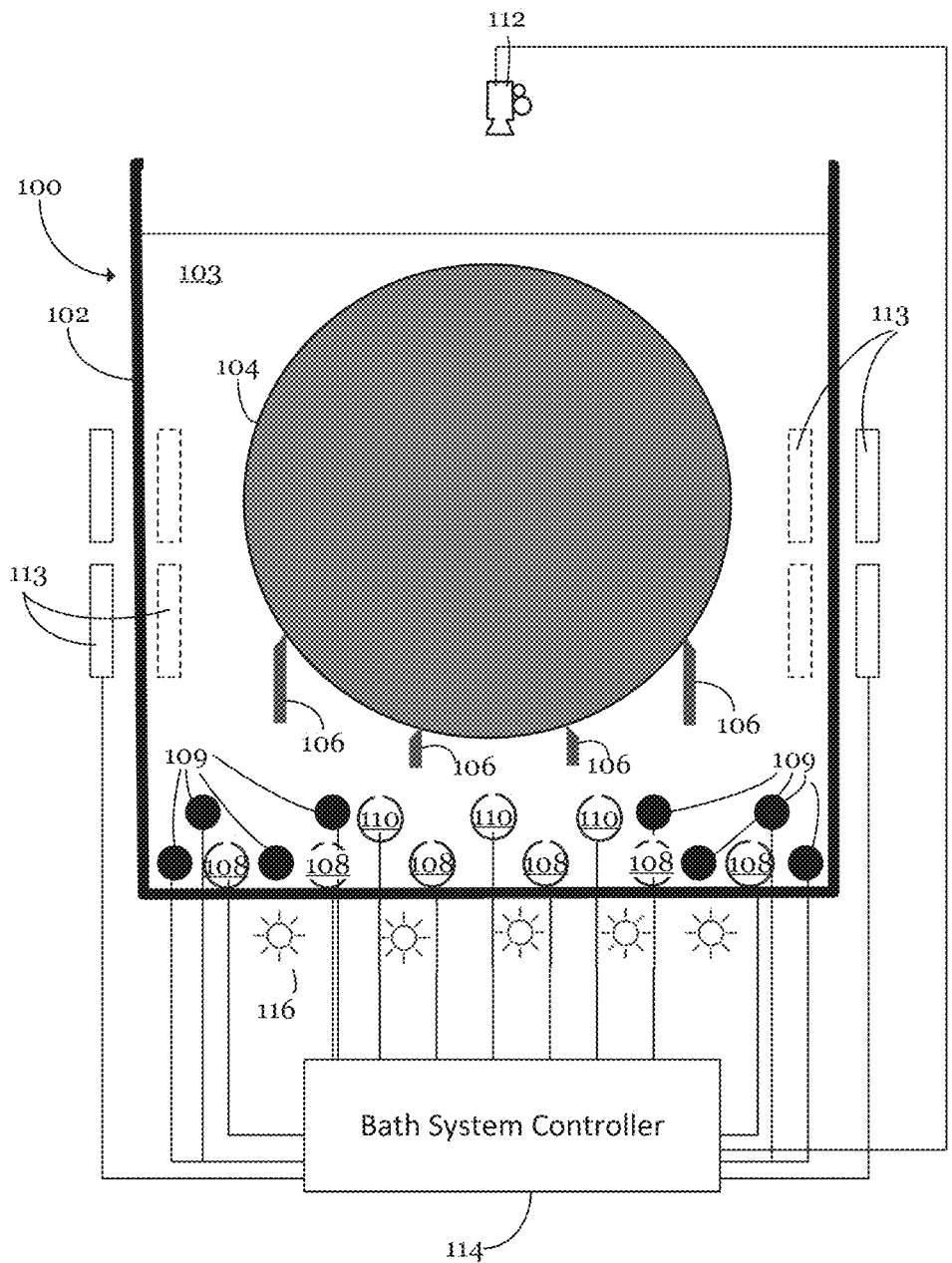
FIG. 1 illustrates a front view of a bath system in accordance with an embodiment of the present application.

FIG. 1 illustrates a front view of a bath system 100 of a processing tool in accordance with an embodiment of the present application.

Referring to FIG. 1, a bath system 100 of a processing tool includes a bath chamber 102 configured to process one or more wafers 104 in a bath solution 103. The bath chamber 102 may include wafers 104 submerged in the bath solution 103 and held by a wafer holder 106. The wafer holder 106 may hold a batch of wafers 104 that may be processed at the same time in the bath solution 103.

The bath chamber 102 may include a first plurality of flow bars 108. In various embodiments, the bath chamber 102 includes the first plurality of flow bars 108 and a second plurality of flow bars 110. The first plurality of flow bars 108 is configured to dispense a gas such as dinitrogen ($N_2$) into the bath chamber 102. The second plurality of flow bars no may be configured to dispense process chemicals including liquids or gases such as etching liquids such as hydrofluoric acid, phosphoric acid, nitric acid, hydrochloric acid, sulfuric acid, aqua regia, potassium hydroxide, tetramethylammonium hydroxide, ammonium hydroxide, hydrogen peroxide, and/or solvents. The solvent, for example, may comprise DI water and/or organic solvents such as acetone and alcohols along with other additives such as surfactants and others, for processing the wafers 104 in the bath chamber 102.

The bath system 100 includes a camera 112, for example, having an image sensor. The camera 112 may be any type of sensor known to record images/video in the art such as a charged coupled device (CCD) image sensor, complementary metal oxide semiconductor (CMOS) image sensor, or the like. The camera 112 may be configured to operate at any visual spectrum such as gray scale or RGB. The camera 112 may include specific filters to filter out or pass through specific wavelengths. The camera 112 may be configured to capture a video of the bath solution 103 over a first interval during processing of wafers 104 from a single field of view. In various embodiments, the camera 112 may be positioned in a variety of locations to allow the camera 112 to record video of the bath solution 103 from different fields of view. In one embodiment, the video may comprise a plurality of images taken continuously over a period of time at a specific frequency or frame rate. In another embodiment, the video may comprise a plurality of images taken separately at different times as in time-lapse imaging. The camera 112 may be positioned above the bath chamber 102, under the bath chamber 102, on either side of the bath chamber or any other position around the bath chamber 102. The camera 112 may also be positioned at any angle with respect to the bath chamber 102. In one or more embodiments, multiple cameras may be positioned around the bath chamber 102 to monitor different portions of the bath solution 103 from different points of view.

In certain embodiments, the bath system 100 may further comprise an audio recorder 113, for example, comprising a plurality of microphones and a recorder. The audio recorder 113 is optional. The plurality of microphones may be located spatially around the bath chamber 102 as to detect spatial variation of sound generated within the bath chamber 102. In an alternate example, the audio recorder 113 may comprise a plurality of hydrophones within the bath chamber 102. The audio recorder 113 may be integrated with the camera 112 in a recording device configured to capture images/video together with audio signals. In one embodiment, the recording of audio signals may be analyzed and used in monitoring the bath process along with analyzing the images/video in accordance with the embodiment method. The audio recorder may be a passive audio system or an active audio system. In the passive audio system, the audio recorder is configured to record sounds (i.e., audio signals) generated by the bath system 100. Examples of the sounds comprise those of bubbles leaving the first plurality of flow bars 108 and/or the second plurality of flow bars 110, and those of bubbles bursting at the surface of the bath solution 103. Alternately, in the active audio system, sound waves may be sent from a sound generator of the active audio system as a probing signal for detecting objects in the bath solution 103 (e.g., bubbles and the wafers 104). A receiver of the active system may then collect sound waves reflected by the objects at, for example, at a location near the sound generator, or collect sound waves attenuated by the objects at, for example, at a location opposite to the generator in the bath chamber 102. In these embodiments, parameters for the probing signal may be selected so that the pressure wave from the sound wave does not induce any unintended changes in the size and shape of bubbles such as cavitation. The sound wave captured by the audio recorder 113 may be analyzed, for example, based on an intensity of audio spatially and/or temporally. Based on the analysis, an audio-based metric indicative of a state of the bath solution 103 may be determined and combined with a video analysis of the embodiment method.

Light sources 116 may illuminate at least a portion of the bath solution 103. In various embodiments, the entire bath solution 103 is illuminated by the light sources 116. The light sources 116 are able to be positioned at any location around the bath chamber 102. The light sources 116 may be at a location of the bath chamber 102 opposite of the camera 112 (e.g., top versus bottom) or at the same side of the bath chamber 102. In one example, the light sources 116 may be included in the first plurality of flow bars 108. In another example, reflective elements may be positioned in the first plurality of flow bars 108 to reflect light sent from a light source on top of the bath solution 103. The manner in which the bath chamber 102 is illuminated is not limited by the present disclosure.

Coupled to (or part of) the bath system 100 may be a controller 114 for setting and controlling various process parameters of the bath solution 103. The controller 114 may be coupled to any or all the components of the bath system 100 to receive information and control each of the components. For example, the controller 114 may be coupled to and control the first plurality of flow bars 108 and the second plurality of flow bars 110. The controller 114 may be configured to change process parameters of the bath solution such as changing the flow rates of first plurality of flow bars 108 and/or the second plurality of flow bars 110, the level and distribution of bubbles (e.g., $N_2$ bubbles formed by the second plurality of flow bars 110), changing the temperature of the bath solution 103, and the like. The controller 114 may comprise one or more processors (e.g., microprocessor, microcontroller, central processing unit, etc.), programmable logic devices (e.g., complex programmable logic device (CPLD)), field programmable gate array (FPGA), etc.), and/or other programmable integrated circuits.

The controller 114 may be further coupled to the camera 112, and the controller 114 may instruct the camera 112 to record a video of the bath chamber 102 and process the output generated by the camera 112. In one embodiment, the controller 114 may also be coupled to the audio recorder 113.

Monitoring the bath process with the camera 112 may include a wide range of techniques for analyzing and processing frames generated by the camera 112 during a recording of the bath solution 103. The monitoring of the bath solution 103 may provide process feedback that may otherwise be unavailable and can lead to process improvements and optimization. Accordingly, in various embodiments, temporal recording, which includes continuous video recording and time-lapse imaging, is an efficient method of data collection that can be done for every wafer. In various embodiments, the temporal recording data may be analyzed to determine and/or control a variety of variables including, the bath solution 103 recipe, the uniformity of the bath solution 103, turbulence uniformity, and the like.

In certain embodiments, illustrated in FIG. 1, the bath system 100 may comprise heating elements 109 such as heating rods configured to introduce heat to the bath system 100. The bath can be a boiling bath (liquid heated to form bubbles). Embodiments of the present invention are also applicable to boiling processes in which heat may be introduced by the heating elements 109 or generated exothermally by reaction of reactants within the bath solution 103. In such cases, gas bubbles may be generated within the bath solution 103 due to localized heating by the heating elements 109, or by exothermic reaction.

The heating elements 109 may be heating rods and may be designed to locally heat the bath solution 103. The localized boiling of the bath solution 103 causes the formation of the gas bubbles around the heating elements 109. For purposes of illustration, heating rods are shown in this arrangement but other arrangements and other types of heating elements 109 can be used. The heating elements 109 may be integrated with the first plurality of flow bars 108 or the second plurality of flow bars 110, and thereby not necessarily a separate component within the bath system 100.

The heat which causes the bath solution 103 to boil can also be produced by an exothermic reaction between reactants within the bath solution 103. For example, the temperature of a piranha bath (sulfuric acid plus hydrogen peroxide) can be controlled with the rate at which hydrogen peroxide is added to the sulfuric acid. For example, the boiling temperature of a hot phosphoric acid/water bath used for stripping silicon nitride can be controlled by keeping the ratio of phosphoric acid to water in the bath solution 103 constant.

Certain embodiments may use the heating elements 109 instead of the first plurality of flow bars 108 and/or the second plurality of flow bars 110, which release the bubble forming gas. Similarly, certain embodiments may use the first plurality of flow bars 108 and the second plurality of flow bars no instead of the heating elements 109. Further embodiments, may skip the first plurality of flow bars 108 and/or the second plurality of flow bars 110 and the heating elements 109 and may rely only on the flow rates of reactants to control the temperature and therefore the bubbles within the bath chamber 102.

Figure 2:
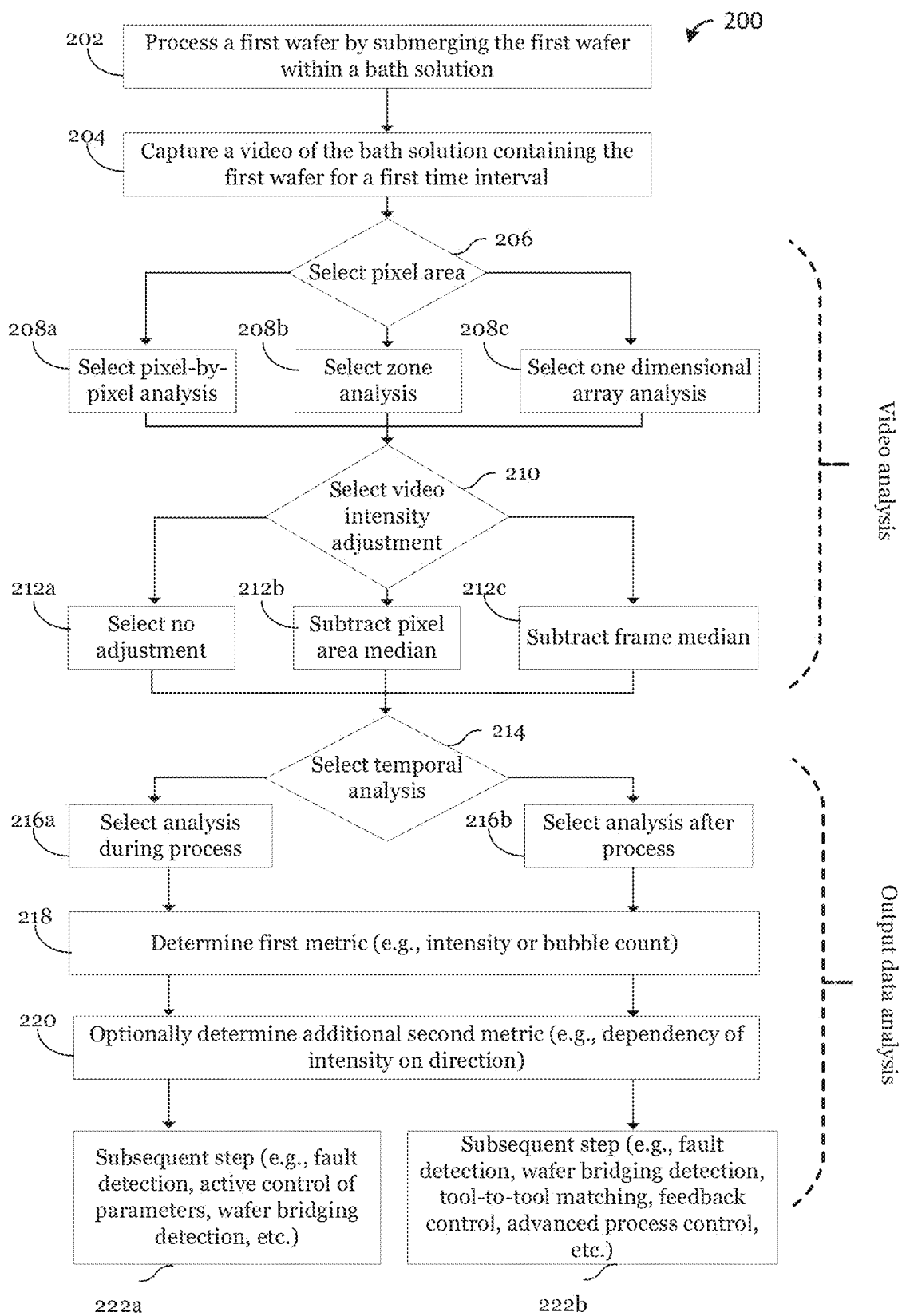
FIG. 2 illustrates a flow diagram of a method for monitoring the batch process in accordance with an embodiment.

FIG. 2 is a flow diagram illustrating of a method 200 for monitoring the bath process in accordance with an embodiment.

As illustrated in block 202 and described with reference to FIG. 1, a first wafer is processed by submerging the first wafer within the bath solution 103. Although method 200 is described for a single wafer, multiple wafers may be submerged into the bath solution 103.

As illustrated in block 204, and described with reference to FIG. 1, a video of the bath solution 103 containing the first wafer is captured during a first time interval. The first time interval may be less than the total amount of time that the first wafer is processed in the bath solution 103. The first wafer may be submerged in the bath solution 103 prior to or after the first time interval. The video of the bath solution 103 may be a video at a given frame rate such as 24 fps, 30 fps, or 60 fps, or a slower time-lapse image sequence. The video of the bath solution 103 may be captured by illuminating portions of (or the entire) bath solution 103 and capturing a video over the first time interval using camera 112 at a specific point of view. The video may comprise a plurality of frames separated in time throughout the first interval of time that may be used to monitor the bath process. The amount of time separating each of the frames depends on the frame rate of the camera 112.

After capturing the video of the bath solution 103, in accordance with various embodiments, different analysis methods may be applied for video analysis (blocks 206-212c) and subsequent output data analysis (blocks 214-222b).

First, pixel areas for the video analysis may be determined (block 206). Although not limiting, three analysis methods are described in this disclosure: a pixel-by-pixel analysis (block 208a, and FIGS. 3A-4), a zone analysis (block 208b, and FIGS. 5A-6), and a one dimensional array analysis (block 208c, and FIGS. 7A-8). In various embodiments, an intensity of light captured in each frame of the video may be analyzed to determine a first metric of the bath solution 103. In certain embodiments, optional video intensity adjustment may be performed prior to determining the first metric of the bath solution 103 (blocks 212a, 212b, 212c, and FIGS. 9 and 10). The embodiment method for monitoring may be applied in different temporal stages (block 214). The first metric may be determined dynamically during the first interval (block 216a) or after processing a first wafer (block 216b). The first metric may comprise a raw light intensity, an adjusted light intensity, a bubble count derived from the adjusted light intensity with an intensity threshold, or the like. In various embodiments, the first metric alone may not be able to define a range of actual metric of interest, for example resulting from an unintentional process variation. Therefore, a second metric may optionally be determined (block 220). The second metric may improve the accuracy and validity of determining a defect or a faulty process in monitoring by providing additional useful information on the bath solution 103. In various embodiments, the second metric may comprise the directional dependency of the light intensity, which may also be useful for example in a symmetry analysis (e.g., FIG. 11) and wafer bridging detection (e.g., FIG. 12A-13). In this disclosure, without specifying, the metric may comprise the first metric, the second metric, and both. Further, additional metrics may also be used.

The metric may be utilized for real time analysis/control and/or post bath process analysis (blocks 222a and 222b). For example, the metric based on the intensity of light may be used to detect non-uniformities in the bath solution 103 in one embodiment. In another example, if the metric is based on the bubble count, the metric may be used to quantify turbulence or parameters such as bubble uniformity. Example embodiment methods of monitoring bath process in accordance with various embodiments will be discussed in more detail below.

In various embodiments, the video may be analyzed based on the intensity of light captured by each frame of the video using the pixel-by-pixel analysis (e.g., block 208a in FIG. 2, and FIGS. 3A-4).

Figure 3A:
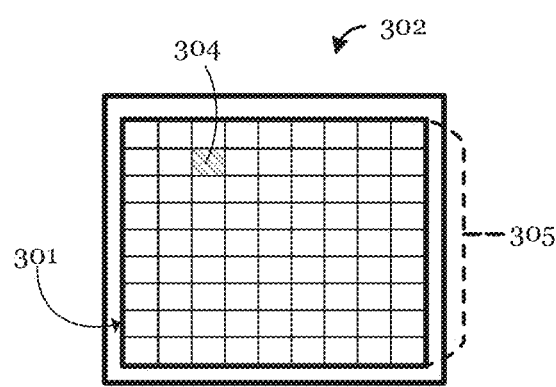
FIGS. 3A and 3B schematically illustrate a pixel-by-pixel analysis for determining a first metric of a bath solution in accordance with an embodiment, where
Figure 3B:
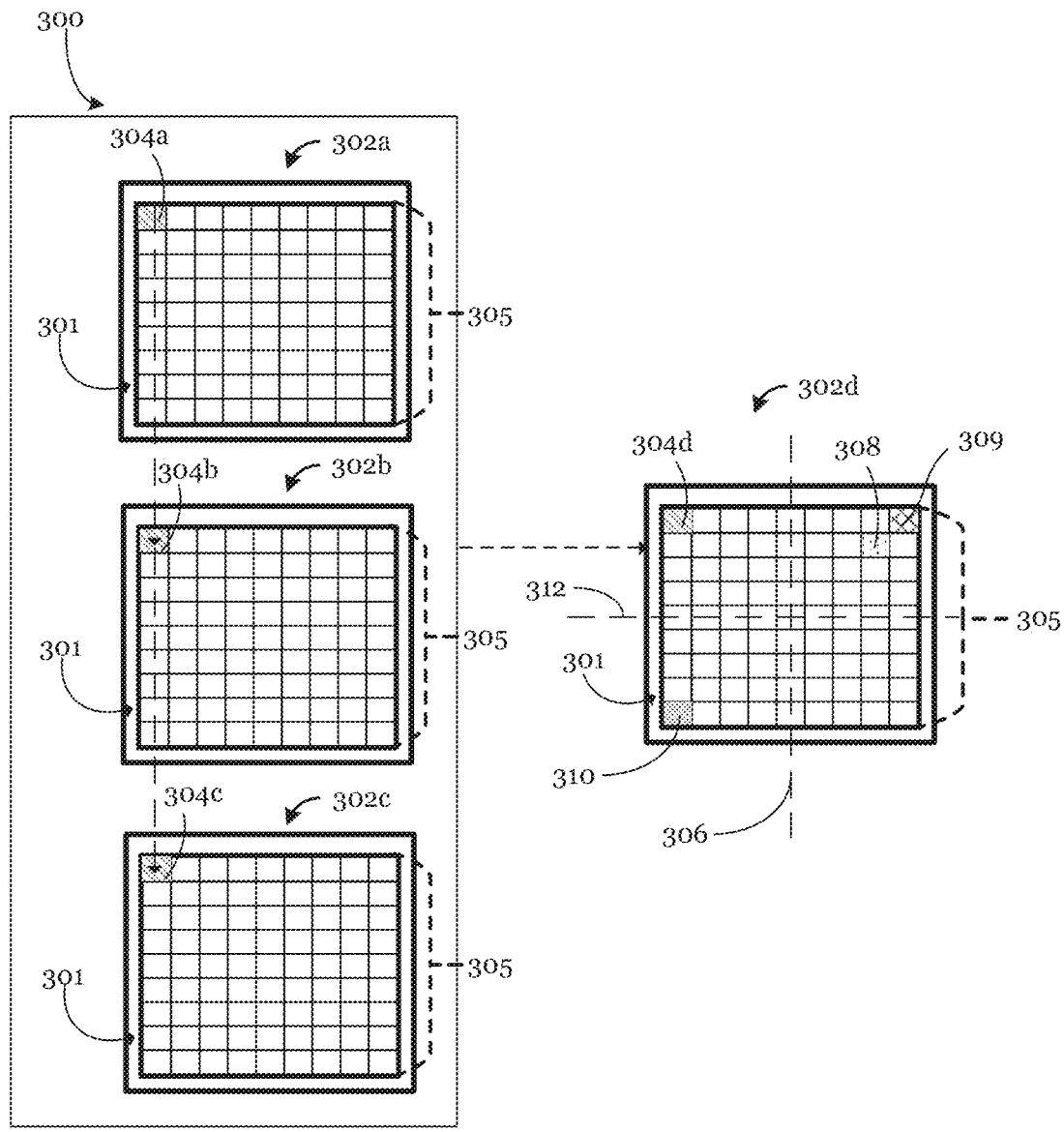
Figure 4:
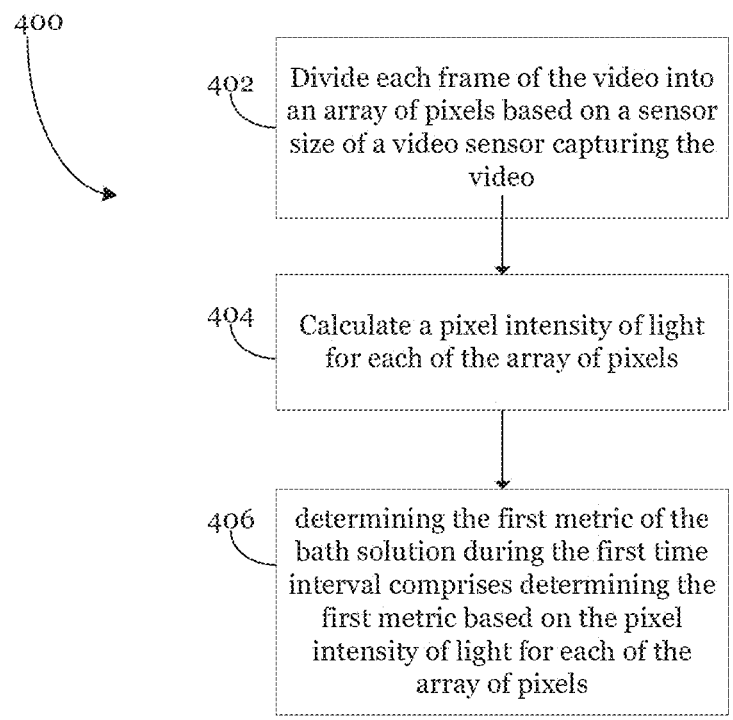
FIG. 4 illustrates a flow diagram of the pixel-by-pixel analysis for determining the first metric of the bath solution based on the intensity of light captured in each frame of the video.

FIGS. 3A and 3B are schematic illustrations of the pixel-by-pixel analysis for determining a first metric of a bath solution in accordance with an embodiment, where FIG. 3A illustrates analyzing the intensity of light captured by a frame, and FIG. 3B illustrates determining the first metric based on the analysis of frames of the video. FIG. 4 is a flow diagram of a method 400 using the pixel-by-pixel analysis for determining the first metric of the bath solution based on the intensity of light captured in each frame of the video.

Referring to FIG. 3A, a frame 302 of the video may include hardware of the bath system 100, such as the bordering portions of the bath chamber 102, along with the bath solution 103. The area of the images/video captured within the frame 302 may depend on the position, angle, and focus of the camera 112. For example, because the camera 112 is positioned over the bath chamber 102, the frame 302 may include the entire bath solution 103 and the bordering bath chamber 102. Additional hardware for the bath system 100 positioned over the bath chamber 102 such as bi-folding lids, for example, may be included in the field of view of the camera 112 and hence may be within the frame 302. Although FIG. 3A illustrates one frame 302 of the video, the analysis performed on frame 302 may apply to all frames of the video or a subset of the frames of the video.

In various embodiments, a region of each of the frames to be analyzed, e.g., a process area 301 may be selected within the frame 302. The same region of the process area 301 may be selected in each of the frames being analyzed. For example, because the entire bath solution 103 is illuminated, the process area 301 of the frame 302 may include the entire bath solution 103. The boundaries of the process area 301 may be vertically and horizontally aligned based on the hardware detected in each of the frames. For example, the top or bottom of the bath chamber 102 may be used for vertical alignment and the left side, or right side of the bath chamber 102 may be used to align the process area 301 in the frame 302. The process area 301 may span the entire bath solution 103 or portions of the bath solution 103. In some embodiments, if there is additional hardware obstructing the view of the bath solution 103, the process area 301 may be formed around the obstruction. For example, if non-transparent ends of otherwise transparent bi-folding lids that meet in the center of the bath chamber 102 block the view of a center portion of the bath solution 103, the process area 301 may include two sections of the visible portions of the bath solution 103 separated by the non-transparent ends of the lids (e.g., left and right sides or upper and lower sides).

Each frame of the video may be divided into an array of pixels 305 based on the sensor size of the camera 112 capturing the video (block 402 in FIG. 4). For example, the process area of frame 302 may be divided into an array of pixels 305. Each pixel 304 of the array of pixels 305 may be arranged in rows and columns across the frame 302. The size and quantity of each pixel 304 may be based on the resolution and the sensor size of the camera 112. Each pixel 304 in FIG. 3A is only for illustration and the size or quantity of each pixel 304 is not to scale. The quantity of rows of the array of pixels 305 may or may not be equal to the quantity of columns across the frame 302.

After dividing each of the frames 302 into the array of pixels 305, a pixel intensity of light for each of the array of pixels 305 may be calculated (block 404 in FIG. 4). The pixel intensity of light may be calculated for each pixel 304 within the process area 301.

Optionally, the calculated pixel intensity of light of each pixel 304 in the frame 302 may be adjusted by subtracting a background intensity of light captured by the frame 302 to eliminate noise (e.g., block 210 in FIG. 2). In one example, the background intensity may be a median of the intensity of light captured at each pixel location 304, across all frames or a subset of frames of a given dataset. In this example, the median intensity for each pixel location 304, can then be subtracted from each corresponding location across all frames of interest. This process of adjustment may be repeated for each of the array of pixels 305 of each frame captured in the video. In another illustration, a background intensity of light may be obtained by using frames before the start of the bubbling/boiling or before turning on the light sources 116. This step may be designed to identify the largest sources of noise, which is then removed from the output of the camera 112

After calculating the pixel intensity of light for each of the array of pixels 305, the first metric of the bath solution 103 during the first time interval may be determined based on the pixel intensity of light for each of the array of pixels 305 (block 406 in FIG. 4).

Referring to FIG. 3B, a plurality of frames 300 may be obtained from the video captured by the camera 112 over the first time interval. Although three frames, a first frame 302a, a second frame 302b, and a third frame 302c are illustrated, this is not indicative for the number of frames that may be obtained over the first interval of time.

In various embodiments, the first metric may be determined by calculating the mean, median, standard deviation, sum, maximum, minimum, or range of the pixel intensity of light between each of the array of pixels 305 that corresponds to a same portion of the area of interest of the process area 301 in each of the plurality of frames 300 (e.g., 302a-c). For example, referring back to FIG. 3B, the first metric may be calculated between a pixel 304a of the first frame 302a, a pixel 304b of the second frame 302b, and a pixel 304c of the third frame 302c.

Because the first metric is determined between corresponding pixels across each of the plurality of frames 300, the first frame 302a, the second frame 302b, and the third frame 302c, may be combined into a single frame 302d. The single frame 302d may comprise an array of pixels 305 that each represents the value of the first metric calculated between each of the array of pixels 305 that corresponds to a same portion of the area of interest of the process area 301 in each of the plurality of frames 300. For example, a pixel 304d of the single frame 302d may comprise the mean, median, standard deviation, sum, maximum, minimum, or range of the pixel intensity of light of pixels 304a-304c.

Alternatively, the video captured over the first time interval may be analyzed using the zone analysis (e.g., block 208b in FIG. 2 and FIGS. 5A-6) by dividing each of the frames into a plurality of zones and determining a zonal intensity of each of the zones. The zonal intensity may be obtained by adding up or averaging pixel intensity from the pixels contained in the zone. Then the first metric of the bath solution 103 during the first time interval may be calculated based on the zonal intensity of each of the zones.

Figure 5A:
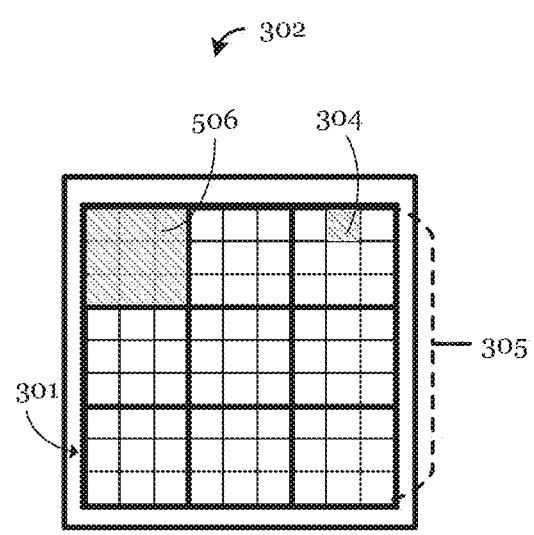
FIGS. 5A and 5B schematically illustrate a zone analysis for determining a first metric of a bath solution in accordance with an embodiment, where
Figure 5B:
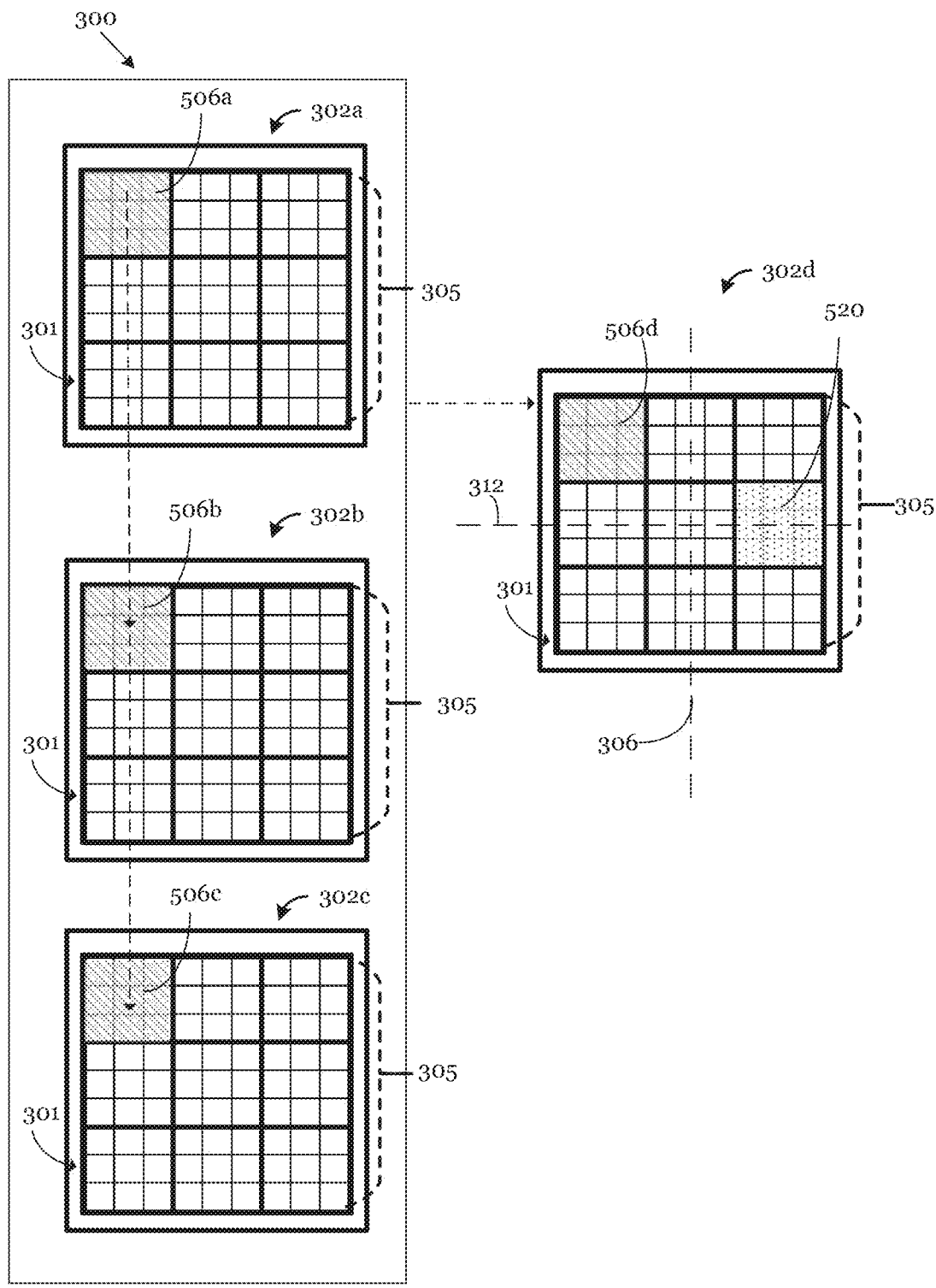
Figure 6:
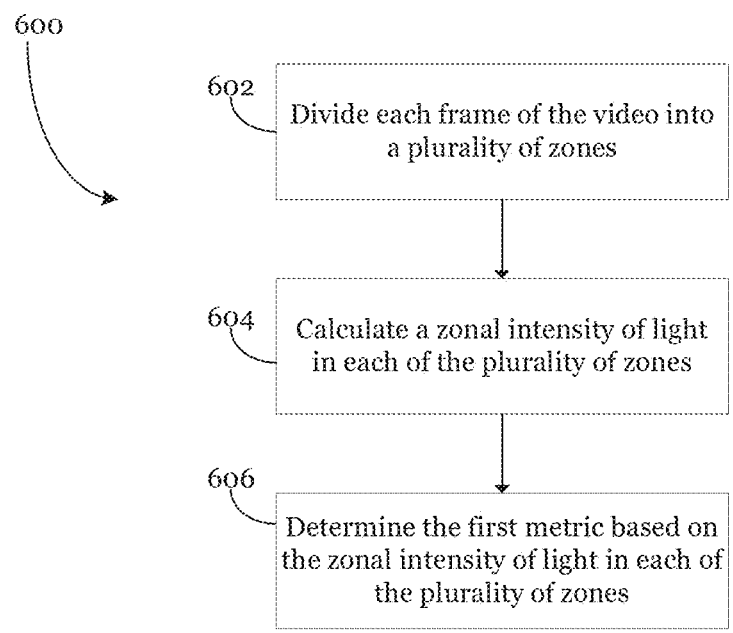
FIG. 6 illustrates a flow diagram of the zone analysis for determining the first metric of the bath solution based on an analysis of the intensity of light captured in each frame of the video.

FIGS. 5A and 5B schematically illustrate the zone analysis for determining a first metric of a bath solution in accordance with an embodiment, where FIG. 5A illustrates analyzing the intensity of light captured by a frame, and FIG. 5B illustrates determining the first metric based on the analysis of frames of the video. FIG. 6 is a flow diagram of a method 600 using the zone analysis for determining the first metric of the bath solution based on an analysis of the intensity of light captured in each frame of the video.

Although FIG. 5A illustrates one frame of the video (the frame 302), the analysis performed on the frame 302 applies to all frames of the video or a subset of all frames of the video.

Referring to FIG. 5A and FIG. 6, each frame of the video may be divided into a plurality of zones 506 (block 602 in FIG. 6). For example, the process area 301 within the frame 302 may be divided into the plurality of zones 506. In the example embodiment illustrated in FIG. 5A, the zone 506 includes 9 pixels (3×3). However, the size and quantity of each of the plurality of zones 506 in FIG. 5A are for illustration only and not to scale. Each of the plurality of zones 506 may include a subset of the array of pixels 305. Each of the plurality of zones 506 may include the same quantity of pixels. The plurality of zones 506 may be arranged in rows and columns across the process area 301. The rows and columns of the plurality of zones 506 may comprise the same quantity or different quantities of zones.

After dividing the frame 302 into the plurality of zones 506, the pixel intensity of light of each of the array of pixels 305 may be determined. Optionally, in the same manner discussed in FIG. 3A, the calculated pixel intensities of light of each pixel 304 may be adjusted based on a background intensity of light captured by the frame 302.

Alternatively, each of the calculated pixel intensities of light may be adjusted by subtracting a background intensity of light captured in each of the plurality of zones 506 (e.g., block 210 in FIG. 2). For example, the background intensity of light captured by the zone 506 may be determined by calculating the median of the pixel intensity of light captured by each of the pixels situated in the zone 506 in a plurality of frames preceding the frame 302. This is because before the appearance of the gas bubble in the zone 506 of the frame 302, the zone 506 in prior frames would be imaging only the background.

After calculating the pixel intensity of light for each of the array of pixels 304, the zonal intensity of light of each of the plurality of zones 506 may be calculated (block 604 in FIG. 6). The zonal intensity of light of each of the plurality zones 506 may be determined by calculating the mean, median, standard deviation, sum, maximum, minimum, or range of the pixel intensity of light between each of the array of pixels located in each of the plurality of zones 506. This process may be repeated for each of the frames captured over the first interval of time.

After calculating the zonal intensity of light for each of the plurality of zones 506, the first metric of the bath solution 103 during the first time interval may be determined based on the zonal intensity of light in each of the plurality of zones 506 (block 606 in FIG. 6).

Referring to FIG. 5B, similar to FIG. 3B, the plurality of frames 300 may be obtained from the video captured by the camera 112 over the first time interval.

The first metric of the bath solution 103 during the first time interval may be determined based on the zonal intensity of light for each of the plurality of zones 506. The first metric may be determined by calculating the mean, median, standard deviation, sum, maximum, minimum, or range of the zonal intensity of light between each of the plurality of zones 506 that cover the same portion of the area of interest of the process area 301 in each of the frames 302a-302c. For example, the first metric may be calculated between a zone 506a of the first frame 302a, a zone 506b of the second frame 302b, and a zone 506c of the third frame 302c.

Because the first metric of the bath solution 103 is determined between each of the plurality of zones 506a-506c across each of the frames 302a-302c, each of the frames 302a-302c may be combined into the single frame 302d. The single frame 302d may comprise a plurality of zones that each represent the value of the first metric of the bath solution 103 calculated across each of the frames 302a-302c. For example, a zone 506d of the single frame 302d may comprise the mean, median, standard deviation, sum, maximum, minimum, or range of the zonal intensity between the zones 506a-506c.

Alternatively, the video captured over the first time interval may be analyzed using the one dimensional array analysis (e.g., block 208c and FIGS. 7A-8) by dividing each of the frames into a one dimensional array of regions and determining a regional intensity of each of the regions. Then the first metric of the bath solution 103 during the first time interval may be calculated based on the regional intensity of each of the regions.

Figure 7A:
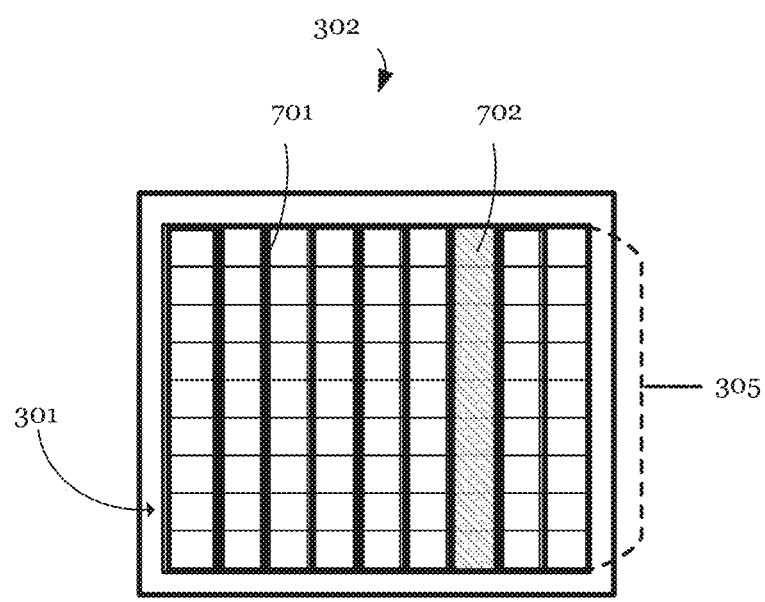
FIG. 7A schematically illustrate a one dimensional array analysis for determining a first metric of a bath solution based on the intensity of light captured by a frame in accordance with an embodiment.

FIG. 7A schematically illustrates a one dimensional array analysis for determining the first metric of the bath solution 103 based on the intensity of light captured by a frame in accordance with an embodiment. Although FIG. 7A illustrates one frame of the video (the frame 302), as in prior embodiments, the analysis performed on the frame 302 may be applied to all frames of the video or a subset of the frames.

Figure 8:
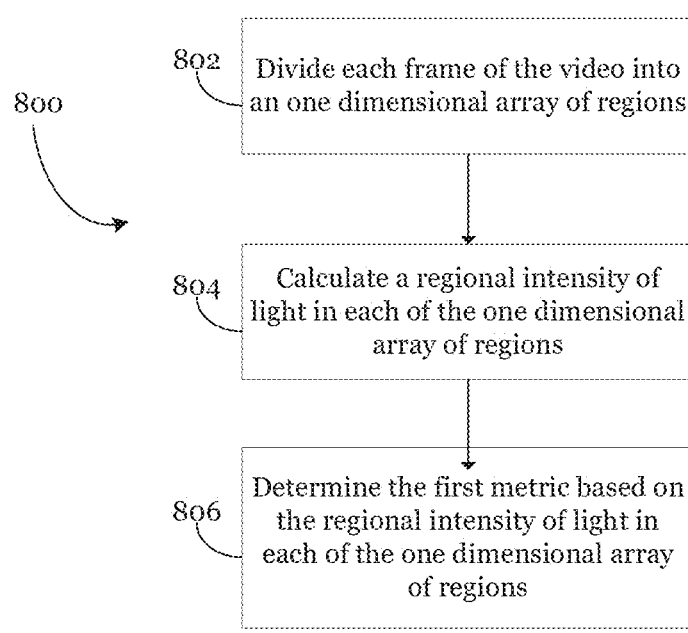
FIG. 8 illustrates a flow diagram of the one dimensional analysis for determining the first metric of the bath solution based on an analysis of the intensity of light captured in each frame of the video.

Referring to FIG. 7A and FIG. 8, each frame of the first video may be divided into a one dimensional array of regions 701 (block 802 in FIG. 8). A region 702 indicates one region of the one dimensional array of regions 701. Although the one dimensional array of regions 701 is illustrated as a vertical array in FIG. 7A, the one dimensional array of regions 701 may extend in any direction (e.g., vertically or horizontally) across the process area 301. Each of the one dimensional array of regions 701 may include a column (or row) of the array of pixels 305.

After dividing the frame 302 into the one dimensional array of regions 701, the pixel intensity of light of each of the array of pixels 305 may be determined. Optionally, in the same manner discussed in FIG. 3A, the calculated pixel intensities of light of each of the array of pixels 305 may be adjusted based on a background intensity of light captured by the frame 302. In certain embodiments, each of the calculated pixel intensities of light may be adjusted by subtracting a background intensity of light captured in each of the one dimensional array of regions 701 (e.g., block 210 in FIG. 2). The background pixel intensity of light may be calculated in as similar manner as described in prior embodiments. Then each of the array of pixels in each of the one dimensional array of regions 701 may be adjusted in the same manner, for example, as each of the array of pixels in each of the plurality of zones 506.

After calculating the pixel intensity of light for each of the array of pixels, the regional intensity of light of each of the one dimensional array of regions 701 may be calculated (block 804 in FIG. 8). The regional intensity of light of each of the one dimensional array of regions 701 may be determined by calculating the mean, median, standard deviation, sum, maximum, minimum, or range of the pixel intensity of light between each of the array of pixels located in each of the one dimensional array of regions 702. This process may be repeated for each of the frames captured over the first interval of time.

Although the one dimensional array of regions 701 is illustrated as an array of pixel columns (1×9), the size of each region in the one dimensional array of regions 701 is not limited and may take any size. In certain embodiments, the one dimensional array of regions 701 may be defined as a sum of certain zones in a row or column. Accordingly, the zonal intensity of light of each zone within each of the one dimensional array of regions 701 may be used to calculate the regional intensity of light of each of the one dimensional array of regions 701.

Therefore, in one embodiment, the one dimensional array analysis may be applied as a secondary analytical step together with the pixel-by-pixel analysis and the zone analysis. Alternatively, in one embodiment, the one dimensional array analysis may be applied as a primary analytical step instead of the pixel-by-pixel analysis and the zone analysis After calculating the regional intensity of light for each of the one dimensional array of regions 702, the first metric of the bath solution 103 during the first time interval may be determined based on the regional intensity of light in each of the one dimensional array of regions 702 (block 806).

Figure 7B:
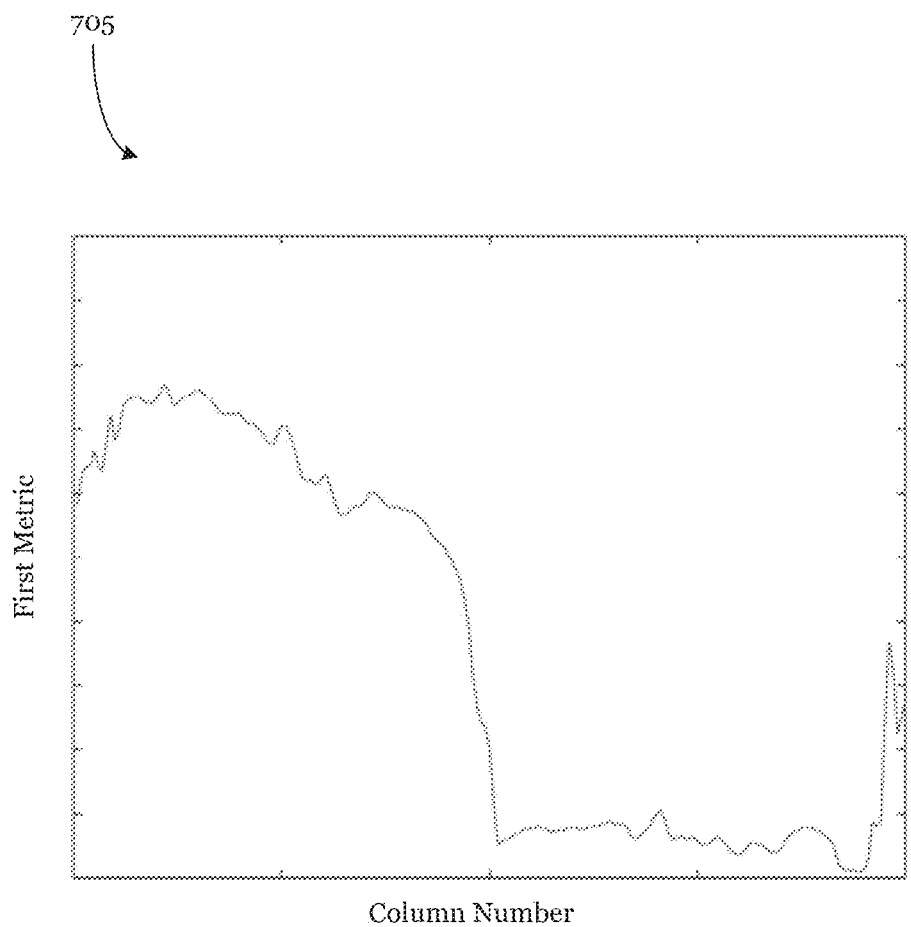
FIG. 7B illustrates an example of vertical one dimensional array analysis derived from the pixel-by-pixel analysis.

FIG. 7B illustrates an example of vertical one dimensional array analysis derived from the pixel-by-pixel analysis. A graph 705 illustrates the first metric as a function of column number. The pixel intensity was determined for each pixel first, and the first metric was calculated by adding up the pixel intensity vertically for each region of the one dimensional array of regions 701. The graph 705 shows how the first metric (e.g., the volumes of process gases/liquids) changes across the locations of the bath solution 103 that correspond to each of the one dimensional array of regions 701. In one embodiment, the graph 705 may be compared to a target process graph to detect a fault in the processing of the first wafer or to provide feedback to the controller for changing a process parameter of the bath solution (e.g., block 222a and 222b in FIG. 2). In another embodiment, the graph 705 may be used to determine a fault in the processing of the first wafer based on a symmetry analysis (e.g., FIG. 11) between columns equidistant from the center of the graph 705.

Figure 7C:
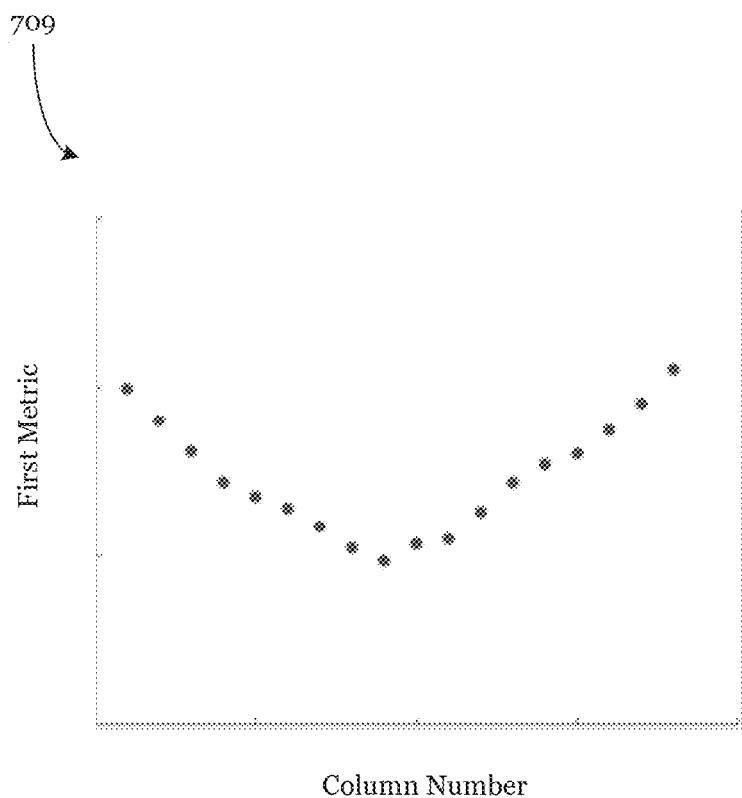
FIG. 7C illustrates an example of vertical one dimensional array analysis derived from the zone analysis.

FIG. 7C illustrates an example of vertical one dimensional array analysis derived from the zone analysis. A graph 709 illustrates how the first metric changes with respect to each of the one dimensional array of regions 701. Similar to the graph 705 in FIG. 7B, the graph 709 shows how the first metric (e.g., the volumes of process gases/liquids) change across the locations of the bath solution 103 that correspond to each of the one dimensional array of regions 701. The graph 709 may be interpreted and used for analysis in the same manner discussed above.

Figure 7D:
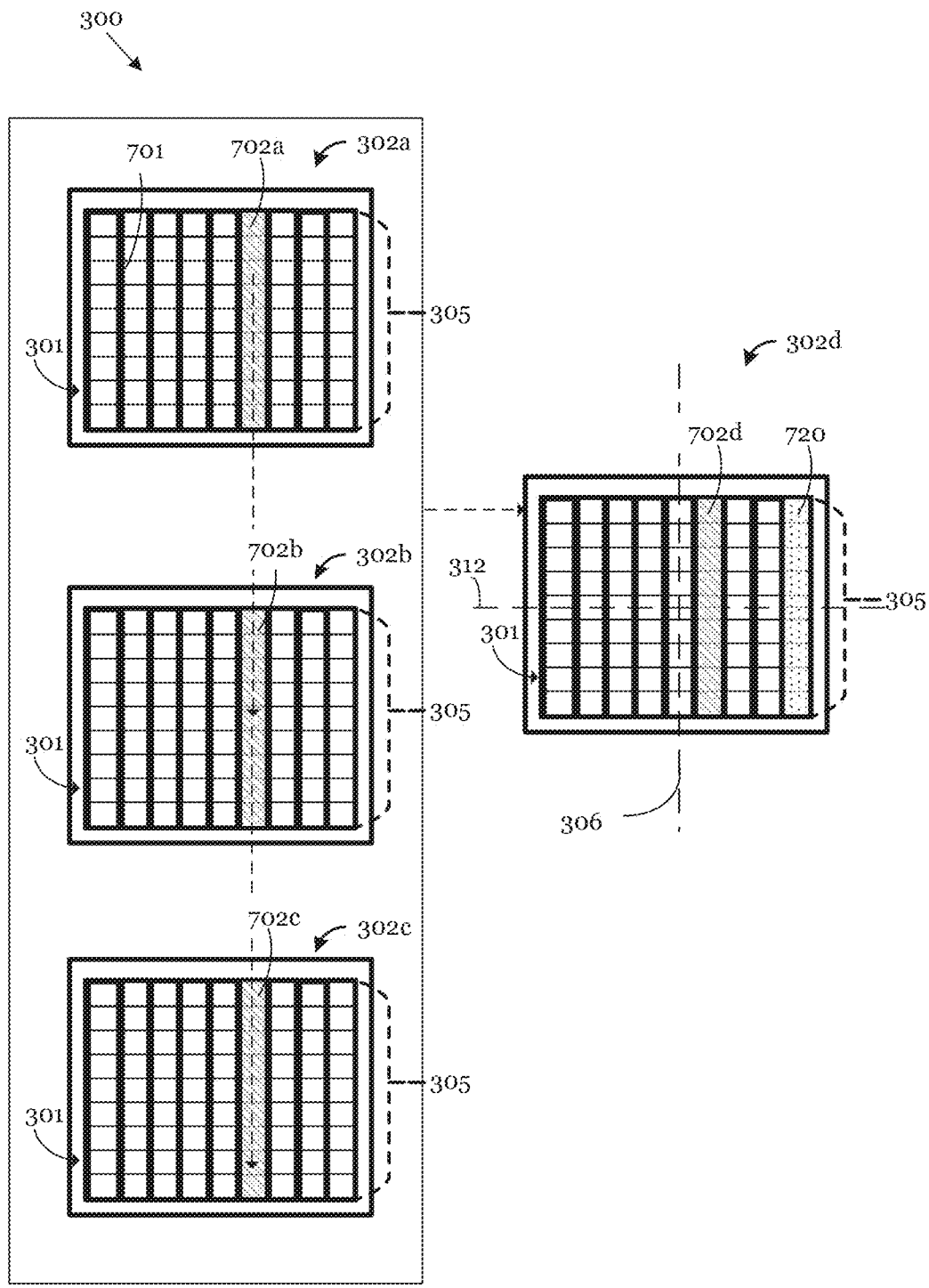
FIG. 7D schematically illustrates the one dimensional array analysis for determining the first metric based on the analysis of frames of the video.

FIG. 7D schematically illustrates the one dimensional array analysis for determining the first metric based on the analysis of frames of the video. Referring to FIG. 7D, a plurality of frames 300 may be obtained from the video captured by the camera 112 over the first time interval. The first metric of the bath solution 103 during the first time interval may be determined based on the regional intensity of light for each of the plurality of the one dimensional array of regions 701.

As similar to other embodiments, the first metric may be determined by calculating the mean, median, standard deviation, sum, maximum, minimum, or range of the regional intensity of light between each of the one dimensional array of regions 701 that cover the same portion of the area of interest of the process area 301 in each of the frames 302a-302c. For example, the first metric may be calculated between a region 702a of the first frame 302a, a region 702b of the second frame 302b, and a region 702c of the third frame 302c.

Because the first metric of the bath solution 103 is determined between each of the one dimensional array of regions 702a-702c across each of the frames 302a-302c, each of the frames 302a-302c may be combined into the single frame 302d. The single frame 302d may comprise a plurality of the one dimensional array of regions 702 that each represents the value of the first metric of the bath solution 103 calculated across each of the frames 302a-302c. For example, a region 702d of the single frame 302d may comprise the mean, median, standard deviation, sum, maximum, minimum, or range of the regional intensity between the one dimensional arrays of regions 702a-702c.

Figure 9:
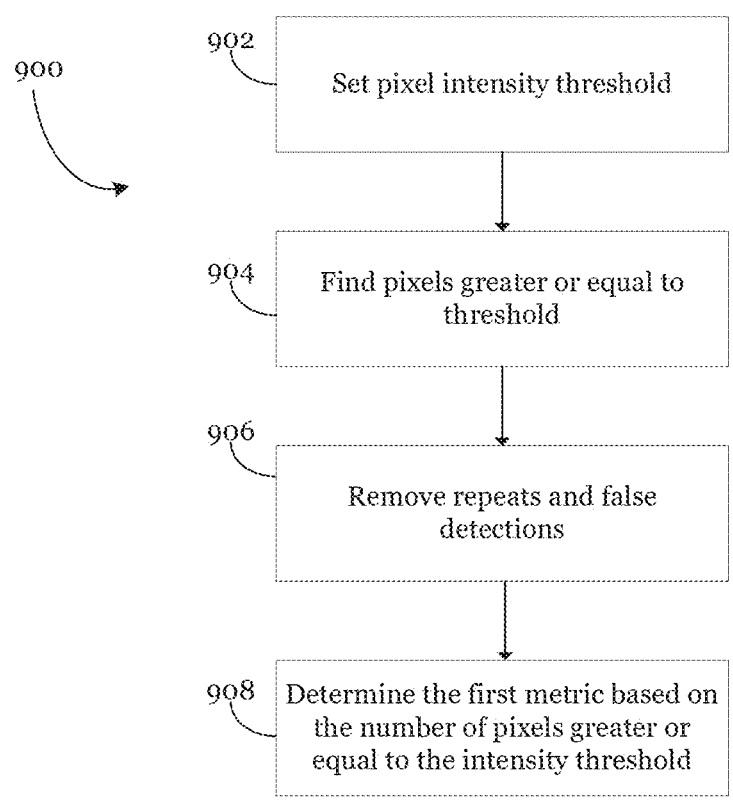
FIG. 9 illustrates a flow diagram of method for determining the first metric of the bath solution based on a number of pixels above threshold intensity in accordance with an embodiment.
Figure 10:
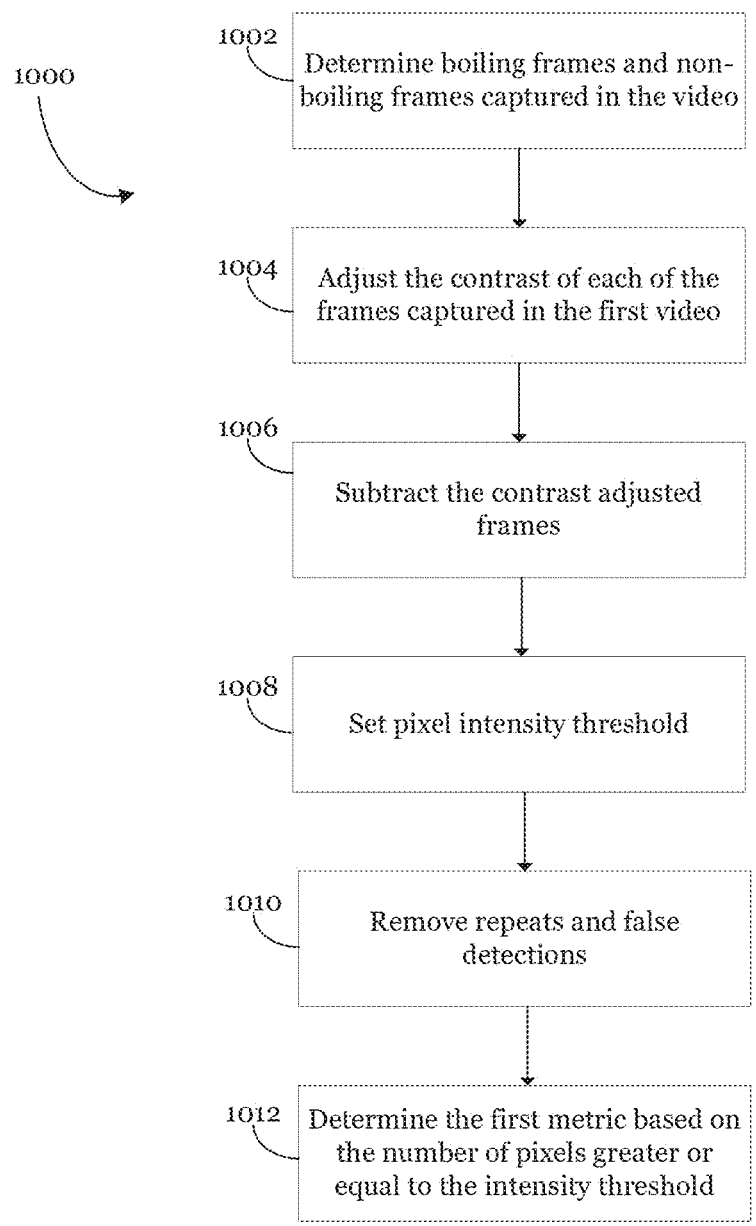
FIG. 10 illustrates a flow diagram of method for determining the first metric of the bath solution where process parameters of the bath solution are intentionally changed in accordance with an embodiment.

In various embodiments, the light intensity adjustment may optionally be performed (e.g., blocks 210, 212b, 212c, and FIGS. 9 and 10).

In certain embodiments, when the video analysis comprises grouping of multiple pixels within a frame of the video (e.g., the zone analysis and the one dimensional array analysis), the first metric may be determined based on a number of pixels in the zone/array above an intensity threshold. In various embodiments, the number of pixels above a threshold may indicate the bubble count, for example, in a zone or a region of a one dimensional array. When the first metric is determined based on the bubble count, the first metric may be used to track the bubble level and distribution of the bath solution 103 over time which may be used to quantify the turbulence or changes in the flow of process liquids/gas (e.g., the chemical condition) of the bath solution 103.

FIG. 9 illustrates a flow diagram of a method 900 for determining the first metric of the bath solution based on a number of pixels above threshold intensity in accordance with an embodiment. Each pixel 304 above the threshold intensity may be used to indicate a bubble. For example, each bubble may correspond to $N_2$ bubbles generated by the first plurality of flow bars 108 (see FIG. 1).

As illustrated in block 902, a pixel intensity threshold may be set. This pixel intensity threshold may be set based on various conditions such as the light source 116 or even based on previously applied metrics to the dataset.

As next illustrated in block 904 and described with reference to FIG. 5A, the pixels 304 with intensities greater than or equal to the threshold may be determined in each of the frames. In the examples of FIG. 5A, each of the array of pixels 305 in each of the plurality of zones 506 may be examined for the pixel intensity threshold criterion.

As next illustrated in block 906, the falsely detected pixels 304 are removed. After removing the falsely detected pixels 304, the number of pixels 304 within each of the plurality of zones 506 in each of the frames (e.g. the bubble count of each zone) may be determined. In one embodiment, the falsely detected pixels may be identified based on the size of the bubble being detected. For example, if the intensity is high in just one pixel and all immediately surrounding pixels are below the intensity threshold, the pixel at the center with the high intensity is likely to be a hot pixel and is not indicative of a bubble since bubbles will likely be imaged in at least a few pixels. Thus, the local neighborhood of the pixels may be analyzed to determine falsely detected pixels 304, which can then be removed. In addition, based on the local neighborhood of pixels, it may also be determined as a false detection based on the size of the bubble detected being too large. The analysis of the local neighborhood of pixels, may also help remove any possible repeats of data.

As next illustrated in block 908, and described with reference to FIG. 5B, the first metric of the bath solution 103 may be determined based on the number of pixels 304 greater than or equal to the intensity threshold. The first metric of the bath solution 103 may be determined by calculating the mean, median, standard deviation, sum, maximum, minimum, or range of the number of pixels 304 greater than or equal to the intensity threshold (e.g., the bubble count) between corresponding zones. For example, the mean, median, standard deviation, sum, maximum, minimum, or range may be calculated between the zones 506a-506c.

In some embodiments, intentional changes to the bath solution 103 that are part of the bath recipe, such as induced boiling or changes to the flow of process gases/liquids may change the intensity of light captured in some of the frames captured during the first time interval. Generally, some information on these intentional changes are known. For example, the effects may be more substantial near the fluid or gas outlets or heating elements, etc. Hence, the changes of the intensity of light that are intentionally induced may be subtracted out prior to determining the first metric.

FIG. 10 is a flow diagram of a method 1000 for determining the first metric of the bath solution 103 when process parameters of the bath solution 103 are intentionally changed in accordance with an embodiment of the present application. While the method 1000 is described with reference to an induced boiling process, changes of other process parameters of the bath solution 103 may be utilized.

As illustrated in block 1002, boiling frames (e.g., frames captured during induced boiling) and non-boiling frames (e.g., frames captured before or after induced boiling) may be determined. The boiling frames and non-boiling frames may be determined based on the time period during the first interval of time that boiling is induced. The boiling may be induced within the bath solution 103 by an exothermic reaction due to the flow of reactants or by the use of heating elements 109 such as heating rods that may introduce localized heating.

As next illustrated in block 1004, the contrast of each of the frames captured in the video may be adjusted. The contrast of each of the frames may be adjusted by amplifying the range of the pixel intensity of light captured in each of the frames. The contrast of each of the frames may be adjusted using image processing techniques known in the art such as a directional filter, a Laplacian filter and the like. Advantageously, because the pixel intensity of light of frames are subtracted in a subsequent step, amplifying the range of the pixel intensity of light captured in each of the frames may ensure a detection of the differences in the pixel intensity of light between successive frames.

As next illustrated in block 1006, the contrast adjusted induced non-boiling frames may be subtracted from the boiling frames. Advantageously, the differences between the light captured in the non-boiling frames are subtracted out and the first metric of the bath solution may be used to determine unintentional changes to the bath solution 103.

As next illustrated in blocks 1008-1012, the process steps of threshold intensity analysis described in blocks 902-908 in FIG. 9 may be repeated to determine the first metric based on the quantity of pixels greater than a threshold intensity (e.g. bubble count). In other embodiments, after subtracting the contrast adjusted frames, the first metric may be calculated based on the intensity of light, for example using the methods 600 or 800.

In various embodiments, the first metric of the bath solution 103 may be determined dynamically while the first wafer is processed (block 216a in FIG. 2). The dynamically updated first metric may be further used for fault detection and/or control of process variables during processing of the first wafer (e.g., block 222a in FIG. 2).

In one example, a fault in the processing of the first wafer may be detected by identifying changes in the first metric at particular locations of the bath solution 103 (e.g., changes in the first metric between the pixels 304a-304c in FIG. 3B, the zones 502a-502c in FIG. 5B, or the one dimensional array of regions 702a-702c in FIG. 7D). Alternatively, non-uniformities across the bath solution may be determined based on the generated single frame 302d. For example, the bath solution 103 may be analyzed based on differences in the first metric between the pixel 304d and a pixel 308 (FIG. 3B), the zone 506d and a zone 520 (FIG. 5B), and the one dimensional array of regions 702d and a region 720 (FIG. 7D). As understood by those with ordinary skill in the art, slight changes in the bath solution 103 may have negligible effect in the processing of the first wafer, or may be due to noise in the intensity of light captured by the frame 302. Therefore, in one or more embodiments, a fault may be detected if the change in the first metric is greater than or equal to a threshold fault detection value. The threshold fault detection value may need to be initially determined, for example, by collecting first metric and comparing with actual faults in the wafer processing. Based on the identified changes in the first metric of the bath solution the cause of the fault may be determined. Causes of the fault may include, but are not limited to, non-uniformities of the bath solution 103, non-uniformities in the hardware of the bath solution such as non-uniform flow rates or compositions of process liquids/gasses dispensed through the first plurality of flow bars 108 or the second plurality of flow bars 110, or too little/much or non-uniform turbulence.

In another example, based on identified changes in the dynamically determined first metric of the bath solution 103, a process parameter of the bath solution 103 may be changed over a second time interval while the first wafer is being processed. For example, process parameters of the bath solution 103 that may be changed include, but are not limited to, the mixture of process gases/liquids dispensed out of the first plurality of flow bars 108 and/or the second plurality of flow bars 110, the bubbling rate of the second plurality of flow bars 110, changing the flow rates of first plurality of flow bars 108 and/or the second plurality of flow bars 110, and changing the temperature of the bath solution 103.

In other embodiments, the first metric of the bath solution 103 may be determined after processing the first wafer (e.g., block 216b in FIG. 2). The first metric may then be used for fault detection, feedback of process variables for processing of a second wafer, and/or correlation of process parameters of the bath solution 103 (e.g., block 222b in FIG. 2).

When the first metric of the bath solution is determined after processing the first wafer, the first metric may be used to analyze particular locations of the bath solution 103 over time (e.g., the pixels 304a-304c in FIG. 3B, the zones 506a-506c in FIG. 5B, or the corresponding one dimensional array of regions 702a-702c in FIG. 7D), or analyze the single frame 302d generated form each frame of the video. For example, the bath solution 103 may be analyzed based on differences in the first metric between the pixel 304d and the pixel 308 (FIG. 3B), the zone 506d and the zone 520 (FIG. 5B), and the region 702d and the region 720 (FIG. 7D).

In various embodiments, the second metric of the bath solution 103 may be determined to provide an additional dimension of analysis of the bath solution 103 (e.g., block 220 in FIG. 2). The second metric may be determined independently from the first metric and then used for the output data analysis. In certain embodiments, the second metric may be derived from the first metric.

The second metric may advantageously improve the detection of a defect or a faulty process in monitoring the bath solution 103. In various embodiments, the second metric may comprise the directional dependency (directionality) of the light intensity. Any predetermined pattern, orientation, or structural feature of the bath and/or the wafers in the bath solution 103 may be used for determining the second metric. The second metric may be determined and applied in the analysis in the same method as described above for the first metric, thereby not described in detail again. For example, the second metric may be determined by the pixel-by-pixel analysis (block 208*a*, and FIGS. 3A-4), the zone analysis (block 208*b*, and FIGS. 5A-6), or the one dimensional array analysis (block 208*c*, and FIGS. 7A-8), horizontally, vertically, or in any direction.

In accordance with an embodiment, a fault detection based on the embodiment method of monitoring is described as follows. In a first example, referring back to FIGS. 3B, 5B, and 7D, a fault may be detected after processing the first wafer based on the uniformity of the metric of the bath solution 103 across the single frame 302*d*. The uniformity across the single frame 302*d* may be determined by a symmetry analysis.

In one embodiment, as illustrated in FIG. 3B, a vertical line of symmetry 306 may be formed across the single frame 302*d*, and the metric determined for pixels, zones, or one dimensional array of regions that are equidistant from the vertical line of symmetry 306 may be compared. For example, a pair of pixels equidistant from the vertical line of symmetry 306 (e.g., the pixel 304*d* and a pixel 309 in FIG. 3B) may be compared. If the metric is significantly different between the pixels, zones, or one dimensional array of regions, a fault may be detected.

In another embodiment, as illustrated in FIG. 3B, a horizontal line of symmetry 312 may be formed across the single frame 302*d*, and a fault may be determined based on a comparison between pixels, zones, or one dimensional array of regions that are equidistant from the horizontal line of symmetry 312. For example, a pair of pixels equidistant from the horizontal line of symmetry 312 (e.g., the pixel 304*d* and a pixel 310 in FIG. 3B) may be compared.

Alternatively, a fault in the processing of the first wafer may be detected by comparing metrics of the bath solution 103 from a first wafer processing and a second wafer processing. In other words, the changes of the metric over time in the first wafer processing may be compared to the changes of the metric over time in the second wafer processing, or the single frame 302*d* may be compared to a further single frame generated from the second wafer processing. Then if significant differences are found between the metrics, a fault in the processing of the first or the second wafer may be determined.

In yet other embodiments, the metric of the bath solution may also be used for tool-to-tool matching (e.g., block 222*b* in FIG. 2). The metrics may be compared between different bath solutions (e.g., a first bath solution and a second bath solution) from different processing tools. Then based on the differences between the metrics, a process parameter of the bath solution 103 may be changed in order to match the metrics for subsequent processing of wafers. For example, process parameters of the bath solution 103 may be changed include, but not limited to, the mixture of process gases/liquids dispensed out of the first plurality of flow bars 108 and/or the second plurality of flow bars 110, the bubbling rate of the second plurality of flow bars 110, changing the flow rates of first plurality of flow bars 108 and/or the second plurality of flow bars 110, and changing the temperature of the bath solution 103.

In one or more embodiments, changes in the metric between corresponding pixels 304 (FIG. 3A), zones 506 (FIG. 5A), or one dimensional array of regions 701 (FIG. 7A) formed across successive frames (e.g., the pixels 304*a*-304*c* in FIG. 3B, the zones 506*a*-506*c* in FIG. 5B, or one dimensional array of regions 702*a*-702*c* in FIG. 7D) are feedback for subsequent processing. In other words, based on changes in the metric detected after processing the first wafer, a process parameter of the bath solution 103 may be changed to improve the uniformity of the metric of the bath solution 103 for processing of a second wafer. Process parameters that may be changed may include, but are not limited to, the process parameters discussed above.

When the metric is determined after the first wafer is processed, the metric may be correlated to a process metric such as surface roughness, thickness of a film being etched, across wafer uniformity of a film thickness, across wafer variation in surface roughness, and other parameters.

In various embodiments, non-uniformities in the bath solution 103 may be detected using a symmetry analysis between two different points of view of the bath solution 103 over the first interval of time.

Figure 11:
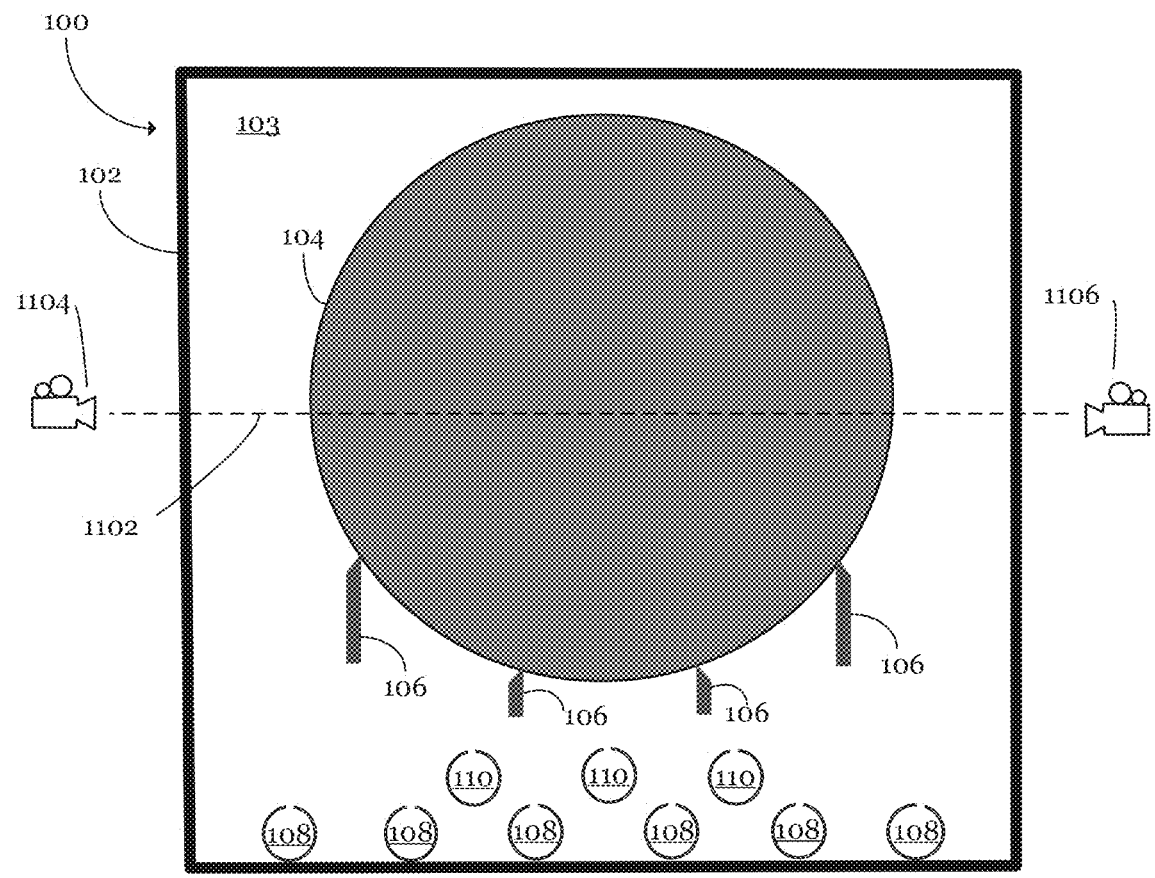
FIG. 11 illustrates a cross-sectional view of bath system for symmetry analysis having two cameras in accordance with an embodiment.

FIG. 11 illustrates a cross-sectional view of bath system having two cameras in accordance with an embodiment.

Referring to FIG. 11, two cameras may be positioned on two opposite sides of the bath solution 103, for example as illustrated, with a first camera 1104 on the left side and a second camera 1106 on the right side. In FIG. 11, a line of symmetry 1102 that may be used for a symmetry analysis is also illustrated. The line of symmetry 1102 may be defined horizontally, vertically, or at any other angle across the bath solution 103.

After a first wafer (or a plurality of wafers) is submerged in the bath solution 103, the first camera 1104 may capture a video of the left side of the bath solution 103 during the first interval of time. Similarly, the second camera 1106 may capture a video of the right side of the bath solution 103 over the first interval of time. Accordingly, a new set of frames may be generated from the video from the second camera 1106, which may then analyzed for the metric in the same manner described above. Then, if the differences between the metrics in the corresponding frames from the two videos that are equidistant from the line of symmetry 1102 exceed a certain threshold, a fault may be detected in the processing of the wafer(s). The symmetry analysis may be performed for any pair of two different process areas of interest. For example, while a left versus right analysis may be performed in one embodiment as illustrated in FIG. 11, other embodiments may use other symmetries in the process chamber. Further, for the symmetry analysis to be performed, two or more cameras may be used but not necessary. One camera, for example, may provide a set of frames of a video which may then be divided into zones equidistant from the line of symmetry 1102 for the symmetry analysis.

In various embodiments of the present application, bridging between wafers 104 in the bath solution may be detected using the video captured over the first time interval by camera 112 (e.g., blocks 222*a* and 222*b* in FIG. 2).

Figure 12A:
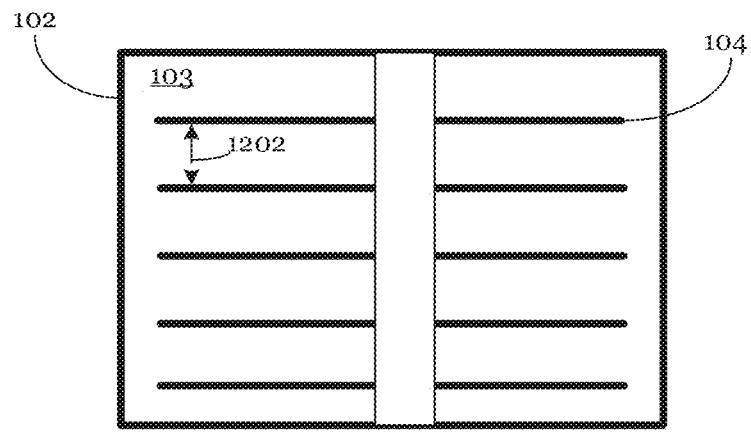
FIGS. 12A-12D illustrate detecting bridging between wafers in accordance with an embodiment of the present application, where
Figure 12B:
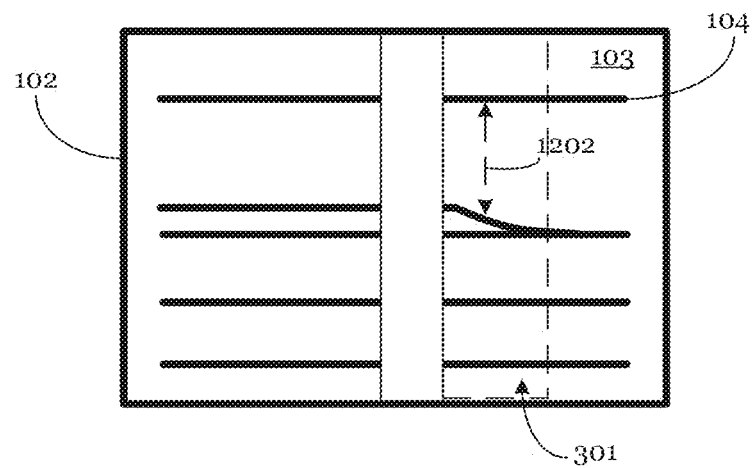
Figure 12C:
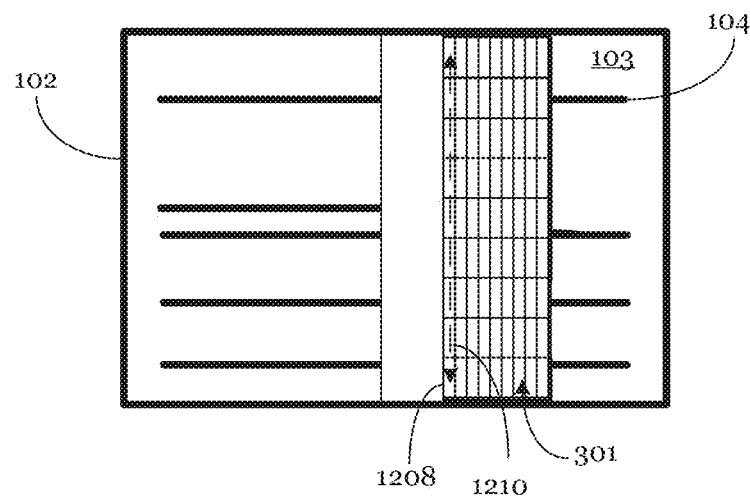
Figure 12D:
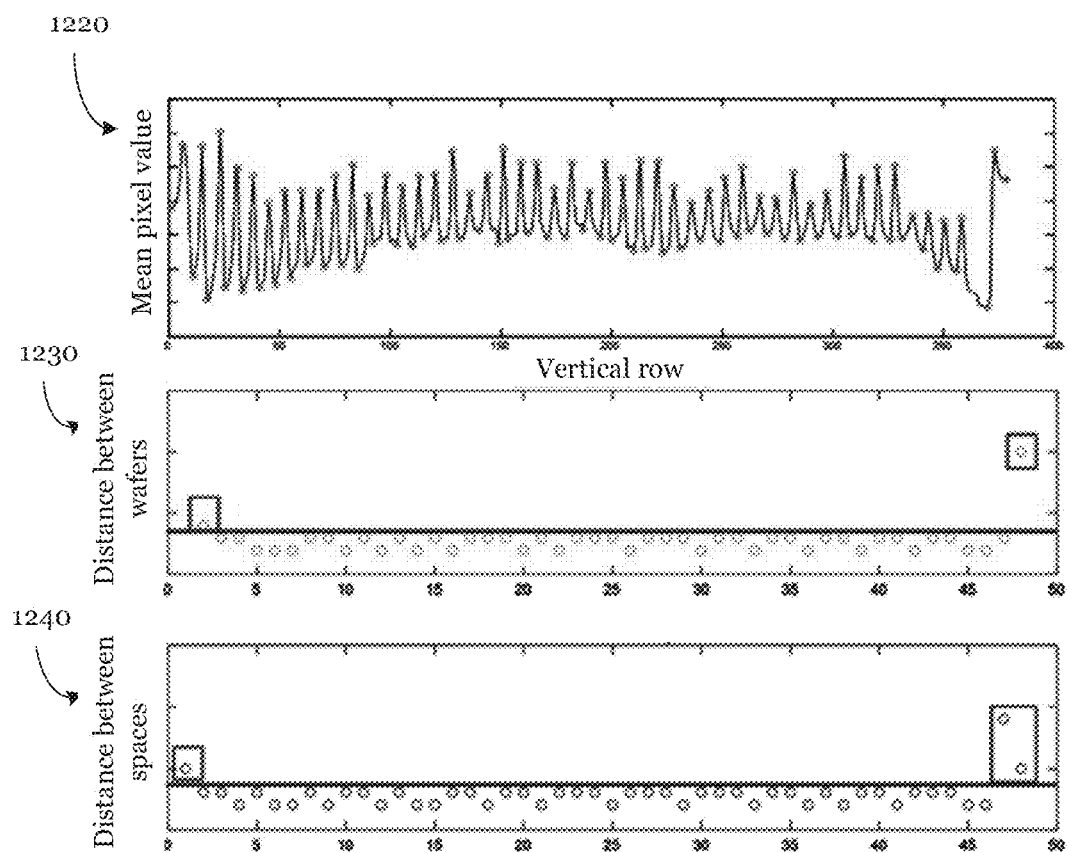
Figure 13:
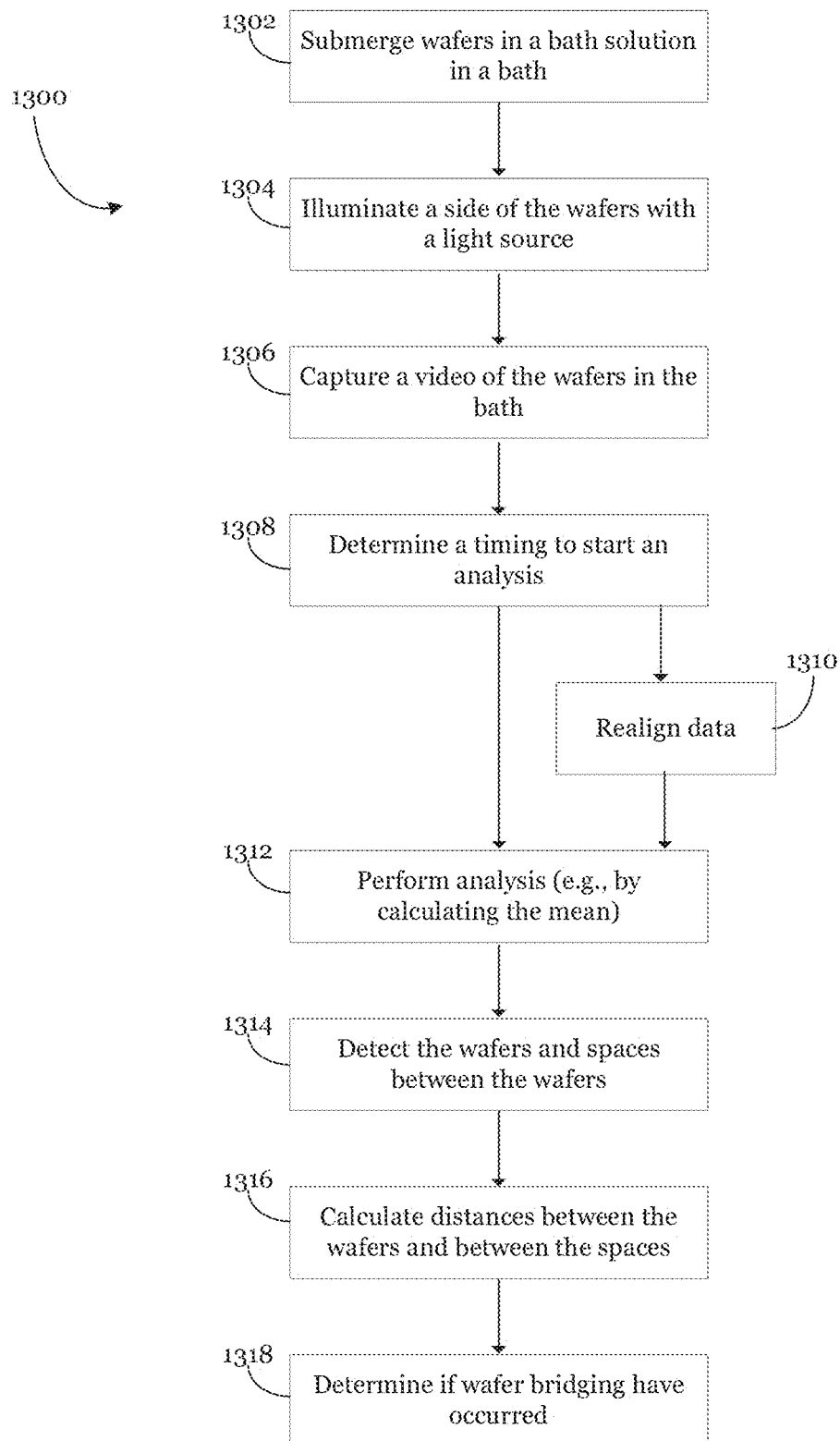
FIG. 13 illustrates a flow diagram of method for detecting wafer bridging in accordance with an embodiment.

FIGS. 12A-12D are schematic illustrations of the process of detecting bridging between wafers (wafer bridging) according to an embodiment of the present application, where FIG. 12A illustrates a top view of a bath chamber after a plurality of wafers are submerged in a bath solution, FIG. 12B illustrates a top view of the bath chamber after wafer bridging occurs, FIG. 12C illustrates the process steps of determining a first analyzing of the intensity of light captured by a frame of a video, and FIG. 12D illustrates an example of the analysis. FIG. 13 is a flow diagram of method 1300 for detecting wafer bridging in accordance with an embodiment.

Referring to FIG. 12A and FIG. 13, a plurality of wafers 104 are submerged in the bath solution 103 (block 1302 in FIG. 13). The plurality of wafers 104 are each separated by a distance 1202 as defined by the substrate holder or boat holding the wafers 104. Prior to bridging, the distance 1202 between adjacent wafers 104 is similar. After the wafers enter the bath to be processed, a side of the wafers may be illuminated with a light source (block 1304 in FIG. 13) and a video of the wafers may be captured (block 1306). However, in some cases, the bridging may occur before the wafers 104 are placed within the bath chamber 102. Bridging or merging of the wafers may cause the wafers being bridged to be misprocessed because surface of portions of the wafer that is bridged is not exposed to the bath solution and may not be processed like other wafers.

As illustrated in FIG. 12B, when the wafers are processed, the wafers may become merged or bridged with other wafers, for example, in the process area 301 due to various reasons. Bridging or merging of the wafers results in variations of the distance 1202 separating the wafers (FIG. 12B). Accordingly, analyzing and detecting any variation of the distance 1202 from the initial value enables the detection of wafer bridging.

As illustrated as a method 1300 in FIG. 13, analyzing the video of the wafers 104 may help to determine when and where bridging might be occurring. Video of a particular location of the chamber is first recorded and stored (block 1306 in FIG. 13). A time duration over which to perform the bridging detection analysis is determined (block 1308 in FIG. 13). An area of the image (e.g., 1210 in FIG. 12C) is also determined to perform the bridging detection analysis (block 1308 in FIG. 13).

Before detecting the wafers, in certain embodiments, the data may optionally be realigned to help with any rotation that may exist in the data and to better detect the wafers (block 1310). The mean is then calculated across this area (block 1312), from which the wafers and spaces can then be detected (block 1314). This detection allows for the distances between the wafers and spaces to be calculated (block 1316), along with the number of wafers that can be detected. These can be used to determine if wafer bridging has occurred (block 1318).

FIG. 12C schematically illustrates an example of this method of detecting wafer bridging described above in accordance with an embodiment. The wafer area to be analyzed may be selected as a region of the process area 301, and may comprise a one dimensional array of regions 1208. For example, the array of regions 1208 may include a column of the array of pixels, normal to the wafers 104, as illustrated by line 1210.

FIG. 12D illustrates an example of the analysis. A graph 1220 illustrates mean pixel values across the one dimensional array of regions. In the graph 1220, high pixel value points represent positions of wafers and low pixel value points represent the absence of wafers (i.e., spaces between the wafers). These pixel value points can be analyzed to calculate, for example, distances between wafers (a graph 1230) or distances between spaces (a graph 1240). In the graph 1230 and the graph 1240, outliers are identified at the beginning and the end of the one dimensional array of regions, as indicated by square boxes. A threshold may be set to determine if a given variation may be indicative of wafer bridging.

In another embodiment, the number of wafers can be counted based on the pixel peaks (or valleys) observed in FIG. 12D. If the number of peaks is less than the number of wafers 104 actually loaded into the bath chamber, wafer bridging can be determined to have occurred.

Example embodiments of the invention are summarized here. Other embodiments can also be understood from the entirety of the specification as well as the claims filed herein. Reference numerals are added below for illustration purposes only and the various examples could be implemented differently and are not to be construed as being limited to only these illustrations.

Example 1. A method of monitoring a bath process that includes processing a first wafer by submerging the first wafer within a bath solution (103); capturing a video of the bath solution (103) containing the first wafer during a first time interval; analyzing the video based on intensity of light captured in a frame (302) of the video; and based on analyzing the video, determining a first metric of the bath solution (103) during the first time interval.

Example 2. The method of example 1, where analyzing the video includes selecting a region of the video to be analyzed and analyzing the same region in further frames of the video following the frame (302).

Example 3. The method of one of examples 1 or 2, where analyzing the video includes dividing each frame (302) of the video being analyzed into an array of pixels based on a sensor size of a camera (112) capturing the video, and calculating a pixel intensity of light for each of the array of pixels, and where determining the first metric of the bath solution (103) during the first time interval includes determining the first metric based on the pixel intensity of light for each of the array of pixels.

Example 4. The method of one of examples 1 to 3, where analyzing the video includes dividing each frame (302) of the video being analyzed into a plurality of zones, and calculating a zonal intensity of light in each of the plurality of zones, and where determining the first metric of the bath solution (103) during the first time interval includes determining the first metric based on the zonal intensity of light in each of the plurality of zones.

Example 5. The method of one of examples 1 to 4, where analyzing the video includes dividing each frame (302) of the video being analyzed into an one dimensional array of regions, and calculating a regional intensity of light for each of the array of regions, and where determining the first metric of the bath solution (103) during the first time interval includes determining the first metric based on the regional intensity of light for each of the array of regions.

Example 6. The method of one of examples 1 to 5, where analyzing the video includes subtracting from the intensity of light captured in each frame (302) of the video being analyzed a background intensity of light obtained for that frame (302).

Example 7. The method of one of examples 1 to 6, where the first metric is determined dynamically during the processing of the first wafer.

Example 8. The method of one of examples 1 to 7, where the first metric is determined after processing the first wafer.

Example 9. The method of one of examples 1 to 8, where the first metric of the bath solution (103) is based on a number of pixels above an intensity threshold.

Example 10. The method of one of examples 1 to 9, where the first metric of the bath solution (103) includes a bubble count of bubbles in the bath solution (103).

Example 11. The method of one of examples 1 to 10, further including determining a second metric of the bath solution (103) during the first time interval based on analyzing the video, the second metric being based on a directionality of the intensity of light captured in each frame (302) of the video being analyzed.

Example 12. The method of one of examples 1 to 11, further including: detecting a fault in processing the first wafer.

Example 13. The method of one of examples 1 to 12, where detecting the fault includes identifying that the first metric of the bath solution (103) changes during the first time interval.

Example 14. The method of one of examples 1 to 13, where detecting the fault includes determining a second metric of the bath solution (103) during the processing of a second wafer, and determining the first metric is different from the second metric.

Example 15. The method of one of examples 1 to 14, further including: changing a process for the bath solution (103) during a second time interval for processing the first wafer in the bath solution (103).

Example 16. The method of one of examples 1 to 15, further including: comparing the first metric of the bath solution (103) with a second metric of another bath solution (103) of a different processing tool; and matching the first metric of the bath solution (103) with the second metric of the another bath solution (103) by adjusting a process parameter of the bath solution (103).

Example 17. The method of one of examples 1 to 16, further including: changing a process for the bath solution (103) during a second time interval for processing a second wafer.

Example 18. The method of one of examples 1 to 17, where analyzing the video includes determining a uniformity of the bath solution (103) during the first time interval based on the intensity of light captured in each frame (302) of the video being analyzed.

Example 19. The method of one of examples 1 to 18, further including: correlating the first metric of the bath solution (103) with a process metric for a processing tool holding the bath solution (103).

Example 20. The method of one of examples 1 to 19, further including: capturing an audio of the bath solution (103) during the first time interval; analyzing the audio based on an intensity of the audio; and based on analyzing the audio, determining an audio-based metric of the bath solution (103) during the first time interval.

Example 21. A method of detecting wafer bridging that includes submerging a plurality of wafers (104) within a bath solution (103); illuminating a side of the plurality of wafers (104) with a light source (116); capturing a first image of a first portion of the side of the plurality of wafers (104); and determining wafer bridging occurred between any one of the plurality of wafers (104) based on the first image.

Example 22. The method of example 21, further including: capturing a second image of a second portion of the side of the plurality of wafers (104), where determining wafer bridging occurred includes comparing the first image with the second image.

Example 23. The method of one of examples 21 or 22, where the first image and the second image are different frames of a video.

Example 24. The method of one of examples 21 to 23, further including: analyzing the first image to determine distance between adjacent ones of the plurality of wafers (104), where determining whether wafer bridging occurred includes determining whether any of the distance between adjacent ones of the plurality of wafers (104) is less than a threshold.

Example 25. The method of one of examples 21 to 24, further including: analyzing the first image to count a number of wafer in the plurality of wafers (104), where determining whether wafer bridging occurred includes determining that the count is less than the actual number of wafers (104) in the plurality of wafers (104).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of monitoring a bath process, the method comprising:
    processing a first wafer by submerging the first wafer within a bath solution;
    capturing a video of the bath solution containing the first wafer during a first time interval, wherein the first wafer remains stationary in the bath solution;
    analyzing the video based on intensity of light captured in a frame of the video, wherein analyzing the video comprises dividing each frame of the video being analyzed into an array of pixels based on a sensor size of a camera capturing the video, and calculating a pixel intensity of light for each of the array of pixels; and
    based on analyzing the video, determining a first metric of the bath solution and a second metric of the bath solution during the first time interval, wherein determining the first metric of the bath solution during the first time interval comprises determining the first metric based on the pixel intensity of light for each of the array of pixels, the second metric being based on a directionality of the intensity of light captured in each frame of the video being analyzed.

2. The method of claim 1, wherein analyzing the video comprises selecting a region of the video to be analyzed and analyzing the same region in further frames of the video following the frame.

3. The method of claim 1, wherein the first metric is determined dynamically during the processing of the first wafer.

4. The method of claim 1, wherein the first metric is determined after processing the first wafer.

5. The method of claim 1, wherein the first metric of the bath solution is based on a number of pixels above an intensity threshold.

6. The method of claim 1, wherein the first metric of the bath solution comprises a bubble count of bubbles in the bath solution.

7. The method of claim 1, further comprising:
    detecting a fault in processing the first wafer.

8. The method of claim 7, wherein detecting the fault comprises identifying that the first metric of the bath solution changes during the first time interval.

9. The method of claim 7, wherein detecting the fault comprises
- determining a second metric of the bath solution during the processing of a second wafer, and
- determining the first metric is different from the second metric.

10. The method of claim 1, further comprising:
- changing a process for the bath solution during a second time interval for processing the first wafer in the bath solution.

11. The method of claim 1, further comprising:
- comparing the first metric of the bath solution with a second metric of another bath solution of a different processing tool; and
- matching the first metric of the bath solution with the second metric of another bath solution by adjusting a process parameter of the bath solution.

12. The method of claim 1, further comprising:
- changing a process for the bath solution during a second time interval for processing a second wafer.

13. The method of claim 1, wherein analyzing the video comprises determining a uniformity of the bath solution during the first time interval based on the intensity of light captured in each frame of the video being analyzed.

14. The method of claim 1, further comprising:
- correlating the first metric of the bath solution with a process metric for a processing tool holding the bath solution.

15. The method of claim 1, further comprising:
- capturing an audio of the bath solution during the first time interval;
- analyzing the audio based on an intensity of the audio; and
- based on analyzing the audio, determining an audio-based metric of the bath solution during the first time interval.

16. A method of monitoring a bath process, the method comprising:
- processing a first wafer by submerging the first wafer within a bath solution;
- capturing a video of the bath solution containing the first wafer during a first time interval, wherein the first wafer remains stationary in the bath solution;
- analyzing the video based on intensity of light captured in a frame of the video, wherein analyzing the video comprises
  - spatially dividing each frame of the video being analyzed into a plurality of zones, each zone of the plurality of zones comprising a contiguous group of physically adjacent pixels; and
  - calculating a zonal intensity of light in each of the plurality of zones; and
- based on analyzing the video, determining a first metric of the bath solution during the first time interval, wherein determining the first metric of the bath solution during the first time interval comprises determining the first metric based on the zonal intensity of light in each of the plurality of zones.

17. A method of monitoring a bath process, the method comprising:
- processing a first wafer by submerging the first wafer within a bath solution;
- capturing a video of the bath solution containing the first wafer during a first time interval, wherein the first wafer remains stationary in the bath solution;
- analyzing the video based on intensity of light captured in a frame of the video, wherein analyzing the video comprises determining a background intensity of light captured for each frame being analyzed and subtracting the background intensity of light for the frame being analyzed from the intensity of light captured in the respective frame of the video being analyzed; and
- based on analyzing the video, determining a first metric of the bath solution during the first time interval.

18. The method of claim 17, wherein analyzing the video comprises
- dividing each frame of the video being analyzed into a one dimensional array of regions, and
- calculating a regional intensity of light for each of the array of regions,
- wherein determining the first metric of the bath solution during the first time interval comprises determining the first metric based on the regional intensity of light for each of the array of regions.

* * * * *